(12) United States Patent
Bikumala et al.

(10) Patent No.: US 11,610,252 B2
(45) Date of Patent: Mar. 21, 2023

(54) DIGITAL FULFILLMENT OF DOCUMENTS AND SOFTWARE

(71) Applicant: Dell Products L. P., Round Rock, TX (US)

(72) Inventors: Sathish Kumar Bikumala, Round Rock, TX (US); Shibi Panikkar, Bangalore (IN); Guruprasad Rao, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 626 days.

(21) Appl. No.: 16/709,966

(22) Filed: Dec. 11, 2019

(65) Prior Publication Data
US 2021/0182942 A1   Jun. 17, 2021

(51) Int. Cl.
| | |
|---|---|
| *G06Q 30/06* | (2012.01) |
| *G06Q 30/0601* | (2023.01) |
| *G06F 16/23* | (2019.01) |
| *G06F 16/93* | (2019.01) |
| *G06F 40/205* | (2020.01) |
| *G06F 8/61* | (2018.01) |
| *G06F 8/65* | (2018.01) |
| *H04L 51/02* | (2022.01) |
| *G06Q 10/083* | (2023.01) |

(52) U.S. Cl.
CPC ........... *G06Q 30/0635* (2013.01); *G06F 8/61* (2013.01); *G06F 8/65* (2013.01); *G06F 16/2379* (2019.01); *G06F 16/93* (2019.01); *G06F 40/205* (2020.01); *G06Q 10/0838* (2013.01); *H04L 51/02* (2013.01)

(58) Field of Classification Search
CPC .. G06Q 30/0635; G06Q 10/0838; G06F 8/61; G06F 8/65; G06F 16/2379; G06F 16/93; G06F 40/205; H04L 51/02
See application file for complete search history.

(56) References Cited

U.S. PATENT DOCUMENTS

| | | | |
|---|---|---|---|
| 9,826,060 B1* | 11/2017 | Johansson | H04L 67/63 |
| 2014/0279324 A1* | 9/2014 | King | G06Q 30/0601 705/34 |
| 2017/0147318 A1* | 5/2017 | Bourke | H04L 67/306 |
| 2018/0211014 A1* | 7/2018 | Jung | G06F 21/10 |

* cited by examiner

*Primary Examiner* — Kristie D Shingles
(74) *Attorney, Agent, or Firm* — Krishnendu Gupta; Deepika Bhayana; Derek Lam

(57) ABSTRACT

In some examples, a server may receive an order from a customer to acquire a computing device. The server may determine a customer and a customer location associated with the order and determine a documentation specification based at least in part on the customer and the customer location. The server may determine content identifiers corresponding to content (e.g., documentation and software) to be provided with the order. The server may associate a device identifier that uniquely identifies the computing device with the content identifiers. The computing device may be shipped to the customer location without the plurality of content. When the computing device is booted at the customer location, the computing device may send the device identifier to the server, the server may determine the plurality of content identifiers associated with the device identifier, and send the plurality of content in a digital form for installation on the computing device.

20 Claims, 10 Drawing Sheets

DIGITAL FULFILLMENT OF DOCUMENTS AND SOFTWARE

BACKGROUND OF THE INVENTION

Field of the Invention

This invention relates generally to digital delivery of documentation (e.g., operating manual, troubleshooting guide, installation guide and other documents related to a product that a customer may acquire from a manufacturer) and software (e.g., an operating system and/or software applications purchased with computing devices, such as anti-virus, video editor, audio editor, photo editor, drawing application, painting application, productivity suite such as a word processing application, a presentation application, a database application, a spreadsheet application, and the like), and more particularly to providing, to the customer, the digital delivery of documentation and software associated with products acquired (e.g., leased or purchased). In some cases, a software agent ("chat bot") may automatically provide and/or install digital content for one or more of the acquired products. Further, a printed copy of the documentation may automatically be provided to the customer.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern computing devices (e.g., IHS), such as desktops, laptops, and tablets can be acquired (e.g., purchased or leased) by various companies (e.g., enterprises) in various countries and multiple states within each country. The acquired computing devices can have a wide variety of configurations, peripheral components and software (e.g., operating system and applications). For ease of use, the computing devices may be shipped with documents, such as manuals, guides and other reference materials. The documents shipped to a particular location or a particular customer may conform to a pre-defined specification (e.g., a predefined format, a specific language, and the like) and are added manually to a container that includes the computing device after the computing device has been assembled. For example, a particular location (e.g., country) or a particular customer (e.g., government or enterprise) may specify that the documents be provided using a particular font in a particular font size, in a particular language. These documents are manually added by a human to each order. For example, for a computing device being shipped to France, a factory worker may walk to a particular location in a warehouse, select French documentation, and manually place the French documentation in the container (e.g., box) being used to ship the computing device. To automate such a process using robots may cost millions of dollars.

In addition, software applications acquired in an order may, in some cases, be installed on the computing devices but may be outdated by the time the customer receives the computing device. Of course, in some cases, software applications acquired in the order may not be installed but may be provided on disk (e.g., optical disk, such as CD-ROM, DVD-ROM, or the like) and the provided software may be outdated by the time the customer receives the computing device. For example, a new version of the software may be released by the time the customer receives the computing device.

Thus, manually adding a hardcopy of documentation, software discs or both to a shipping container in which a computing device is being shipped is labor intensive and is cost inefficient.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may receive an order from a customer to acquire a computing device. The server may determine a customer and a customer location associated with the order and determine a documentation specification based at least in part on the customer and the customer location. The server may determine content identifiers corresponding to content (e.g., documentation and software) to be provided with the order. The server may associate a device identifier that uniquely identifies the computing device with the content identifiers. The computing device may be shipped to the customer location without the plurality of content. When the computing device is booted at the customer location, the computing device may send the device identifier to the server, the server may determine the plurality of content identifiers associated with the device identifier, and send the plurality of content in a digital form for installation on the computing device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
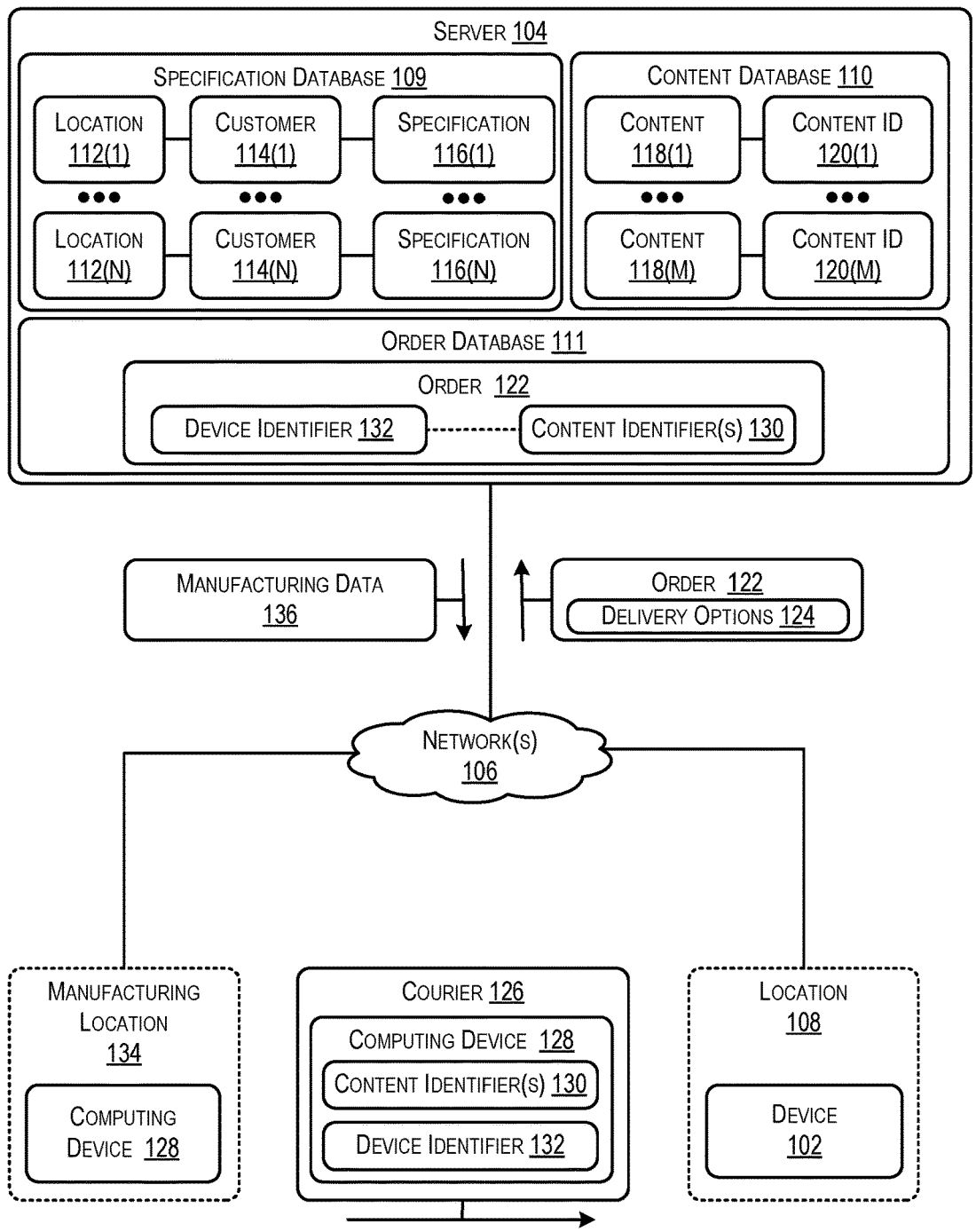
FIG. 1 is a block diagram of a system that includes a server to receive an order to acquire a computing device, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein provide digital content, including documentation and software, to a customer who has placed an order to acquire a computing device (e.g., IHS) and at least one application. The computing device may be a smartwatch, a smartphone, a tablet, a laptop, a 2-in-1 (e.g., a tablet that can be converted to a laptop), or the like. At least some of the documentation associated with the computing device and the software installed (or to be installed) on the computing device may be provided via digital delivery, over a network. The term documentation refers to documents associated with (i) a computing device, (ii) software associated with the computing device, or (iii) both. For example, documentation may include an operating manual, a troubleshooting guide, an installation guide, associated with the computing device and/or software associated with the computing device.

An order may be received from a particular customer (e.g., a government agency or a corporate entity) in a particular country. The order may be to acquire (e.g., lease or purchase) a computing device and software (e.g., an operating system and one or more applications). The order may specify whether the user desires to receive hardcopy documentation related to items being acquired in the order (e.g., an operating manual associated with the computing device, a configuration guide associated with the software and the like). It should be appreciated that the systems and techniques described herein may be used to reduce the effort of manually packaging documentation with the order, and may reduce the effort to update the documentation and software associated with the computing device.

The server may determine, based on the order, an identity of a customer (e.g., government, enterprise, individual, or the like) that has placed the order and a location (e.g., country, state, or the like) to which the order is to be sent. Based on the customer and the location, the server may determine a content specification. For example, a country may specify that manuals are to be provided in a particular language, with a particular font size, and the like. As another example, an enterprise customer may specify that particular types of manuals be provided (e.g., troubleshooting guides to enable the enterprise's internal information technology department to service the computing devices), the language(s) in which the manuals are to be provided, and so on. Based on the content specification, the server may determine a first content identifier that is associated with at least one document (e.g. operating manual, troubleshooting guide, installation guide, or the like) to be delivered with the order. Based on the order, the server may determine a second content identifier that is associated with a software application acquired in the order. The computing device may have an associated device identifier. For example, the device identifier may be a serial number, a service tag, or another type of identifier to uniquely identify the computing device. The content identifiers may be associated with the device identifier and stored in a database. The content identifiers may be used to identify the customer's entitlements, e.g., the digital content (e.g., documentation, software) that the customer acquiring the computing device is entitled to receive. The server may store the device identifier (and/or the content identifiers) in a location in a protected, non-volatile memory (e.g., Basic Input Output System (BIOS), or other protected non-volatile memory) of the computing device. Non-volatile memory is a type of memory where data written to the non-volatile memory survives re-boots and restarts. Protected memory refers to memory that has some sort of protection mechanism to enable authorized applications to write to the protected memory and to prevent unauthorized applications from writing to the protected memory. The computing device and any accessories (e.g., peripheral devices such as keyboard, mouse, external drive, printer, or the like) being acquired in the order may be placed in one or more containers and shipped to the location specified in the order.

By shipping the computing device (and any accessories) without including hardcopy documentation in the shipping container, several types of savings may be achieved. First, a factory worker does not have to manually find the hardcopy documentation that complies with the documentation specification and place the hardcopy documentation in the shipping container, thereby saving time and labor costs. Second, the shipping container weighs less because of the lack of hardcopy documentation, thereby reducing shipping costs. Third, the manufacturer does not have to print and store multiple hardcopy documents to meet each of the different documentation specifications, thereby saving printing costs, inventory costs, and the space used to store the inventory of hardcopy documents.

After the computing device has been delivered to the customer's location, the customer may power-on the computing device, causing the computing device to boot for the first time (e.g., first customer-initiated boot). During the initial boot, a customer service engine executing on the computing device may retrieve the device identifier (or the content identifiers) from the location in the protected non-volatile memory of the computing device and send the device identifier (and/or the content identifiers) to a content server.

Based on the device identifier, the server may access an order database to determine the content entitlements and the corresponding content identifiers. The server may retrieve, from a content database, content (e.g., documents, software applications) in digital format corresponding to the content identifiers and send the content to the computing device. For example, when the content comprises a document, the document may be provided in one of a variety of digital formats including (but not limited to) Portable Document Format (PDF), a Hypertext Markup Language (HTML) file, or the like. In some cases, the customer may specify in the order, a format of the document. The customer service engine may receive the digital content from the server and store the digital content in a particular location on the computing device. When the digital content comprises a software application (e.g., anti-virus, photo editor, illustrator, or the like), the customer service engine may automatically install the software application. For documents, the customer service engine may indicate how to access the documents to enable the customer to access the digital document. The server (or the customer service engine) may determine, based on a particular content identifier, whether the digital content is to be provided as a hardcopy. For example, in the order, the customer may have paid for a hardcopy manual of a document or an optically-readable disc (e.g., CD-ROM, DVD-ROM, or the like) that includes a software application. If the server determines, based on the order, that the digital content is to be provided as a hardcopy, then the server may send the digital content (e.g., corresponding to a particular content identifier) to a third party, which is in physical proximity of the location of the computing device. The third party may print the document to create a hardcopy document or burn an optical disc with the software application and instruct a courier to deliver the hardcopy (e.g., document or disc) to the location where the computing device is located.

In some cases, the server may provide a single hardcopy for more than one computing device. For example, an enterprise customer may order five computing devices to be delivered to a particular location. The server may instruct a third party to print and deliver a single hardcopy of an operating manual document to the particular location based on determining that the same customer ordered multiple computing devices to be delivered to the same location.

The server may retrieve, from a database, a software application corresponding to the content identifier and send the software application to the computing device. The software application may be provided to the computing device as an executable file. The customer service engine may receive the software application from the server and automatically install the software application on the computing device. In this way, the customer may automatically have a latest version of the software application installed on the computing device after the computing device is initially booted instead of having an outdated version that was installed at the factory.

After the customer receives and begins to use the computing device, the customer may have an issue, such as how to configure the computing device, how to use a particular feature of the computing device (or how to use software installed on the computing device), or the like. The customer may open a chat application to initiate a chat session (e.g. an interactive session between the computing device and the server) with an automated agent ("chat bot") executing on the server. The server may receive a message from the computing device to initiate the chat session between the software agent ("chat bot") executing on the server and a chat application executing on the computing device. The software agent on the server may use the chat application to determine the device identifier (e.g. a service tag, a serial number, or the like) associated with the computing device that uniquely identifies the computing device. The software agent may look up the device identifier in a database to determine the entitlements associated with the computing device. During the chat session, the server may receive a query from the customer regarding an issue associated with the computing device or components (e.g., software applications, peripherals or the like). The server may parse the query using Natural Language Processing (NLP) to create a parsed query. The server may send a request to the chat application, based on the parsed query, to send configuration information and logs associated with one or more components of the computing device. The software agent on the server may, based on the parsed query, the configuration information, and the logs, determine one or more solutions to the issue. If updated documentation is available, the software agent may send the updated documentation to the computing device and suggest that the customer follow a particular procedure ("see page 6") to resolve the problem. If a video is available on the internet (e.g., manufacturer's support site), then the software agent may open a browser and open the site to the video that explains how to address the issue. If updated software (e.g., operating system fix, updated application, updated driver, or the like) is available, the software agent may send the updated software to the chat application and the chat application may automatically install the updated software to address the issue.

As a first example, a server may include one or more processors and one or more non-transitory computer readable media storing instructions that are executable by the one or more processors to perform various operations. For example, the operations may include receiving, from a customer, an order comprising a request to acquire a computing device. The operations may include determining, based on the order, a location to which the order is to be sent and the customer associated with the order. The operations may include determining a documentation specification associated with at least one of the location or the customer. For example, the documentation specification may include at least one of a font type specification, a font size specification, and a language specification. The operations may include determining, based on the order and the documentation specification, a plurality of content identifiers, including a first content identifier associated with a document (e.g., Owner's Manual) to be provided with the order, and a second content identifier associated with software (e.g., Anti-Virus, Photo Editor, Video Editor, Illustrator, Painter, or the like) to be provided with the order. The operations may include determining, based on the order, a delivery type associated with individual content identifiers of the plurality of content identifiers. For example, the delivery type may specify that particular content be provided (i) as a digital copy or (ii) as the digital copy and a hardcopy (e.g., printed and bound owner's manual, optical disc on which the software has been burned) corresponding to the digital copy. The operations may include determining a unique identifier associated with the computing device that uniquely identifies the computing device from among other computing devices. For example, the unique identifier may be a service tag or a serial number. The operations may include associating the unique identifier with the plurality of content identifiers and storing the unique identifier and the associated plurality of content identifiers in a database on the server. The operations may include instructing a courier to deliver the computing device to the location without including hardcopies of content to be provided with the order.

After the customer receives the computing device, the server may receive, during an initial boot of the computing device, the unique identifier and determine, using the database, the plurality of content identifiers associated with the unique identifier. The server may send, to the computing device, a plurality of content corresponding to the plurality of content identifiers. For example, the plurality of content may include a digital copy of the document associated with the first content identifier and a digital copy of the software associated with the second content identifier. If the customer has specified in the order, particular content items of the plurality of content items that are to be provided as hardcopy, the server may send the particular content items in digital format to a hardcopy provider. The hardcopy provider may create a hardcopy corresponding to individual ones of the particular content items and have the hardcopies delivered to the customer location. For example, the hardcopy provider may print and bind a digital document to create a hardcopy of the digital document. As another example, the hardcopy provider may write software and associated data to an optical disc (e.g., CD-ROM, DVD-ROM, BR-ROM, or the like) to create a hardcopy of the software.

As a second example, a server may include one or more processors and one or more non-transitory computer readable media storing instructions executable by the one or more processors to perform various operations. For example, the operations may include receiving, from a customer, an order comprising a request to acquire a computing device. The operations may include determining, based on the order, a location of the customer. The operations may include determining a documentation specification based on (i) the location and (ii) the customer. The operations may include determining, based on the order and the documentation specification, (i) a first content identifier associated with a document to be provided with the order and (ii) a second content identifier associated with a software application to be provided with the order. The operations may include determining, based on the order, a delivery type associated with the document to be provided with the order. The operations may include instructing a courier to deliver the computing device to the location of the customer without including hardcopies of content to be provided with the order.

After the customer receives the computing device, the operations may include receiving, during a boot (e.g., typically an initial boot) of the computing device, the first content identifier, determining that the document is to be provided as a digital document, and sending the digital document to the computing device. The operations may include determining that the document is to be provided as a hardcopy document and sending the digital document to a hardcopy provider, wherein: the hardcopy provider is located within a predetermined distance of the location of the customer and the hardcopy provider creates the hardcopy document corresponding to the digital document for delivery to the location of the customer. The operations may include determining a unique identifier associated with the computing device that uniquely identifies the computing device from among other computing devices. For example, the unique identifier may be one of a service tag or a serial number. The operations may include associating the unique identifier with the first content identifier and the second content identifier and storing the unique identifier and the associated first content identifier and the second content identifier in a database. The document may have a format such as, for example, a Portable Document Format (PDF) format or a Hypertext Markup Language (HTML) format. The operations may include receiving, during a boot (e.g., initial boot) of the computing device, the second content identifier and sending, from the server to the computing device, the software application. The computing device may automatically install the software application after receiving the software application.

As a third example, a server may include one or more processors and one or more non-transitory computer readable media storing instructions executable by the one or more processors to perform various operations. For example, the operations may include receiving, from a customer, an order comprising a request to acquire a computing device and determining, based on the order, a location of the customer. The operations may include determining a documentation specification based on the location and the customer and determining, based on the order and the documentation specification, a first content identifier associated with a document to be provided with the order. The operations may include determining, based on the order, a second content identifier associated with a software application to be provided with the order. The operations may include instructing a courier to deliver the computing device to the location without including hardcopies of content to be provided with the order. The operations may include receiving a message from the computing device to initiate a chat session and initiating the chat session between a software agent ("chat bot") executing on the server and a chat application executing on the computing device. The operations may include receiving, via the chat session, a unique identifier (e.g., a service tag or a serial number) identifying the computing device and determining, based on the unique identifier, a plurality of content identifiers including the first content identifier and the second content identifier. The operations may include receiving, via the chat session, information from the customer describing an issue associated with the computing device and parsing the information using Natural Language Processing (NLP) to create parsed information. The operations may include sending, based on the parsed information, a request to the chat application to send configuration data and logs associated with the computing device. The operations may include receiving, from the chat application, the configuration data and the logs associated with the computing device. The operations may include determining, based on the parsed information, the configuration data and the logs, additional digital content comprising additional documentation and additional software. The operations may include sending, based on the parsed information, the configuration data and the logs, the additional digital content to the computing device. The operations may include determining, based on the unique identifier and the configuration data, a platform type of the computing device, a current hardware configuration of the computing device, and a current software configuration of the computing device. For example, the additional digital content may include at least one of (i) an updated digital document or (ii) an updated software application. The chat application may automatically install the updated digital content (received from the server) on the computing device. The operations may include customizing the additional digital content based on (i) the parsed information, (ii) the configuration data, and (iii) the logs to create customized digital content, and sending the customized digital content to the computing device. The operations may include receiving, from the chat application, a request to provide the additional digital content as a hardcopy and sending, the additional digital content from the server to a hardcopy provider. For example, the hardcopy provider may create the hardcopy (e.g., by printing and binding documentation or by burning software and data to an optical disc, such as CD-ROM, DVD-ROM, BD-ROM, or the like) corresponding to the additional digital content and sending the hardcopy to the location of the customer.

FIG. 1 is a block diagram of a system 100 that includes a server to receive an order to acquire a computing device 128, according to some embodiments. A device 102 may be connected to a server 104 (e.g., a virtual server or a physical server) via a network 106. The device 102 may be located at a location 108. The device 102 may send an order 122 including a request to acquire (e.g., buy or lease) a computing device 128 and one or more software applications. For example, the device 102 may include any type of device that includes a processor, such as, for example, a laptop, a tablet, a desktop, a smart phone, a smart watch or the like. For ease of understanding, assume that the location 108 is a delivery location (e.g., where the computing device 128 is to be delivered) specified in the order 122. Of course, the delivery location 108 need not be where the device 102 is located. The order 122 may include delivery options 124 selected by the customer identifying how the customer desires that content be delivered. For example, if the customer desires a hardcopy of documentation (e.g., owner's manual) or software, then the customer may select a hardcopy delivery option for the particular content. In such cases, the digital content for which the customer desires a hardcopy may be sent to a third-party provider. The third-party provider may print and bind documentation to create hardcopy documentation. The third-party provider may write ("burn") software (e.g., operating system, anti-virus, and the like) onto an optical disc to create a hardcopy of the software. The third-part provider may have the hardcopy documentation, the hardcopy software, or both delivered to the customer location via a courier, as described herein.

The server 104 may include a specification database 109, a content database 110, and an order database 111. The databases 109, 110, 111 may be SQL databases, Oracle® databases, NoSQL databases, or other types of databases. The specification database 109 may include specifications provided by particular locations (e.g., country, state, or city) and specifications provided by enterprise customers or government entities. For example, the specifications may specify how documentation is to be provided, including a language in which documentation is to be provided, a font type and a font size in which documentation is to be provided, and the like. The content database 110 may include content identifiers 120(1) to 120(M) associated with digital content 118(1) to 118(M), respectively (where M>0). The digital content 118 may include (i) digital documentation, such as owner manuals, installation manuals, troubleshooting guides, and the like and (ii) software, such as operating systems (e.g., Windows®, Chrome®, Linux®, and the like), anti-virus software, productivity applications (e.g., office suite, video editor, audio editor, photo editor, illustration software, paint software) and the like.

After receiving the order 122 from the device 102, the server 104 may determine the location 108 to which the computing device 128 is to be shipped. Based on the location 108, the server 104 may identify a particular location 112, from locations 112(1) to 112(N), in the specification database 109 and a corresponding one of the specifications 116(1) to 116(N), where N>0. For example, the location 112(N) may be a country or a state that provides a corresponding specification 116(N). The specification 116(N) may specify that documentation be provided in a particular set of (e.g., one or more) languages. For example, the German government may specify that computing devices shipped to Germany be provided with documentation in German, the French government may specify that computing devices shipped to France be provided with documentation in French, and so on. After determining that the location 108 (e.g., Munich) is located in location 112(N) (e.g., Germany), the server 104 may determine that the specification 116(N) is to be used when providing documentation with the computing device 128.

In cases where the order 122 is placed by an enterprise customer, a government agency, or the like, the server 104 may determine a customer that placed the order 122 and identify the customer among customers 114(1) to 114(N) in the specification database 109. For example, an enterprise customer (e.g., a large company such as Boeing or the like) or a government entity (e.g., University, municipality, government agency, or the like) may provide a particular specification of the specifications 116. In such cases, the specification 116 associated with the customer 114 that placed the order 122 may take precedence over the specification associated with the location 112. For example, a German company may provide a specification that specifies that documentation be provided in both German and English.

Based on the order 122, the server 104 may identify one or more content items (e.g., documentation, software, and other entitlements) from the content 118(1) to 118(M) that are to be provided with the computing device 128 that conform to the specification 116(N) and determine the corresponding content identifiers from the content identifiers 120(1) to 120(M). For example, assume that the content 118(M) (e.g., an owner's manual in German) is to be provided with the computing device 128. The server 104 may determine that the content identifier 120(M) corresponds to the content 118(M). The order 122 may include delivery options 124 that identify which of the digital content items are to be provided as hardcopy (in additional to softcopy). For example, the customer may order a hardcopy of an owner's manual, a hardcopy (e.g., optical disc) of the operating system, or the like.

The server 104 may send manufacturing data 136 to a factory at a manufacturing location 134. The factory at the manufacturing location 134 may assemble the computing device 128 and ship the computing device 128 via a courier 126 to the customer location 108. The computing device 128 may have an associated device identifier 132, that uniquely identifies the computing device 128, such as a serial number, a service tag, or the like. The server 104 may associate the device identifier 132 with content identifiers 130 and store the device identifier 132 and the content identifiers 130 in an order database. The content identifiers 130 may include one or more of the content identifiers 120 that identify digital content (of the content 118) that is to be provided to the customer based on the order 122. For example, the content identifiers 130 may identify documentation (e.g., owner's manual, troubleshooting guide, and the like) and software (e.g., operating system, anti-virus, productivity application, and the like) that the customer is entitled to receive based on the order 122. The content identifiers 130 may be associated with the device identifier 132 and stored in the order database 111.

Prior to shipping the computing device 128 to the customer location 108 via the courier 126, the factory at the manufacturing location 134 may store the device identifier 132, and, in some cases, the content identifiers 130, in a protected non-volatile memory of the computing device 128. Protected means that only certain applications that have the correct authorization are able to write, delete, or modify the memory location where the device identifier 132 (and the content identifiers 130) are stored. Non-volatile means that the data (e.g., the device identifier 132 and the content identifiers 130) stored in the memory location survives re-boots, restarts, and the like. For example, the device identifier 132 (and the content identifiers 130) may stored in a read-only memory that is also used to store a basic input output system (BIOS), or on a special disk partition that is reserved for use by the manufacturer of the computing device 128. The factory may ship the computing device 128 from the manufacturing location 134 to the customer location 108 via the courier 126.

Thus, when a customer places an order to acquire a computing device and one or more software items (e.g., operating system and applications), the order may be sent to a server. The server may determine, based on the order, a location where the order is to be sent and determine a specification associated with the location. The server may identify content identifiers corresponding to content to which the customer is entitled, based on the order and the location specification. The server may determine if the customer that placed the order, such as an enterprise customer or government agency, has provided a documentation specification. If the customer has provided a documentation specification, the server may identify content identifiers corresponding to content to which the customer is entitled, based on the order and the customer specification. The content identifiers may be associated with a device identifier (e.g., serial number or service tag) that uniquely identifies the computing device and stored by the server in an order database. In this way, hardcopy manuals and hardcopy software discs (e.g., optical discs on which software code has been written) are not included when the computing device is shipped to the customer location, thereby saving the time and effort for a human (or a robot) to find and include in the shipment the hardcopy manuals that conform to a particular specification associated with the customer location or the customer. Instead, when the customer initially boots the computing device, the computing device sends the device identifier to the server, the server determines the content (documentation and software) entitlements based on the content identifiers associated with the device identifier and automatically provides digital copies of the content to which the customer is entitled, as described in more detail below. In this way, the computing device is shipped faster and at a lower shipping cost because hardcopy documentation and software discs are not included when shipping the computing device to the customer location.

Figure 2:
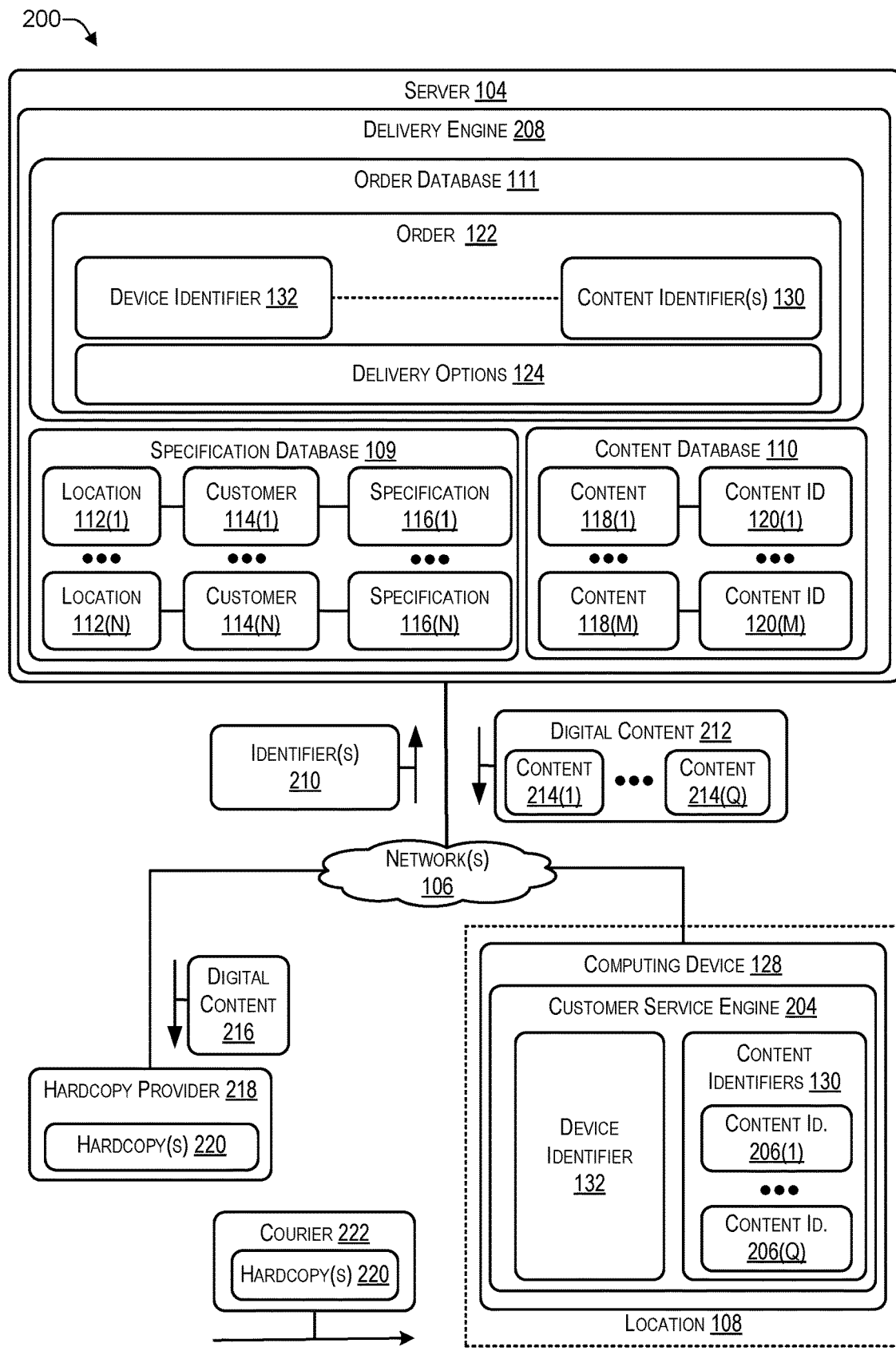
FIG. 2 is a block diagram of a system that includes a server to receive one or more content identifiers from a computing device, according to some embodiments.

FIG. 2 is a block diagram of a system 200 that includes a server to receive one or more content identifiers from a computing device, according to some embodiments. After receiving the computing device 128, the customer may power-on the computing device 128, causing the computing device 128 to boot. During the boot, a customer service engine 204 on the computing device 128 may automatically retrieve the device identifier 132 and/or the content identifiers 130 from a particular location (e.g., in protected non-volatile memory) of the computing device 128. The content identifiers 130 may include content identifiers 206(1) to 206(Q) (where Q>0). For example, the content identifier 206(1) may be associated with an owner's manual for the computing device 128, the content identifier 206(2) may be associated with an operating system installed on the computing device 128, the content identifier 206(3) may be associated with an owner's manual for the operating system, the content identifier 206(4) may be associated with an anti-virus software application installed on the computing device 128, the content identifier 206(5) may be associated with an owner's manual for the anti-virus software application, and so on.

The customer service engine 204 may send one or more identifiers 210 to a delivery engine 208 executing on the server 104. The identifiers 210 may include the device identifier 132, the content identifiers 130, or both. If the device identifier 132 (without the content identifiers 130) is sent, then the server 104 may use the device identifier 132 to determine, using the order database 111, the content identifiers 130 associated with the device identifier 132. The delivery engine 208 may retrieve, from the content database 110, digital content 214(1) to 214(Q) corresponding to the content identifiers 206(1) to 206(Q), respectively. The delivery engine 208 may send digital content 212, including the content 214(1) to 214(Q), to the customer service engine 204. The customer service engine 204 may install the digital content 212 on the computing device 128. For example, when the content 214 comprises documentation, the customer service engine 204 may place the documentation in a particular location and enable the customer to access the documentation, e.g., via a help application. When the content 214 comprises software (e.g., anti-virus, office suite, photo editor, video editor, illustrator, painter, or the like), the customer service engine 204 may automatically (e.g., without human interaction) install the software on the computing device 128. In this way, the customer receives the latest version of documentation and software when the computing device 128 is initially booted.

In some cases, the customer order 122 may specify delivery options 124 indicating that the customer desires a hardcopy of particular documentation or particular software. For example, the customer may desire a hardcopy of a user's manual to enable the customer to annotate the hardcopy user's manual. As another example, the customer may desire a hardcopy (e.g., written to an optical disc) of an antivirus to enable the customer to run a virus scan after the BIOS boots but before the operating system has booted or the customer may desire a hardcopy (e.g., written to an optical disc) of an operating system to enable the customer to reinstall the operating system if the boot disc becomes corrupted. If the delivery options 124 indicate that the user has purchased (e.g., by selecting in the order 122) hardcopy of one or more of the content items 214, then the delivery engine 208 may send digital content 216 (e.g., one or more of the content items 214(1) to 214(Q)) to a hardcopy provider 218. For example, after the delivery engine 208 receives the identifiers 210 and looks up the order 122, the delivery engine 208 may determine the delivery options 124 and send the digital content 216 to the hardcopy provider 218 based on the delivery options 124. The hardcopy provider 218 may create one or more hardcopies 220 corresponding to the digital content 216. For example, when the digital content 216 includes documentation, then the hardcopy provider 218 may print and bind the digital content 216 (e.g., in a format such as pdf, word, html or the like) to create the hardcopy 220. When the digital content 216 includes software, then the hardcopy provider 218 may write the digital content 216 (e.g., in a format such as .exe, .msi, or another type of executable file) to an optical disc (e.g., CD-ROM, DVD-ROM, or the like) to create the hardcopy 220. The hardcopy provider 218 may use a courier 222 (e.g., postal service, FedEx, UPS, DHL, or the like) to deliver the hardcopy 220 to the customer location 108.

In some cases, after a period of time, when the customer subsequently powers-on the computing device 128, the customer may desire to purchase hardcopies of documentation, software, or both. In such cases, the customer may use the customer service engine 204 to pay for hardcopies to be delivered. For example, the customer service engine 204 may send the identifiers 210 to the delivery engine 208 and specify the particular content for which the customer desires hardcopies. In response, the delivery engine 208 may send the digital content 216 to the hardcopy provider 218, the hardcopy provider 18 may create hardcopies 220 corresponding to the digital content 216, and instruct the courier 222 to deliver the hardcopies 220 to the customer location 108.

Thus, when a customer places an order to acquire a computing device and one or more software items (e.g., operating system and applications), the order may be sent to a server. The server may identify content identifiers corresponding to content to which the customer is entitled, based on the order and the location specification. The content identifiers may be associated with a device identifier (e.g., serial number or service tag) that uniquely identifies the computing device and stored by the server in an order database. In this way, hardcopy manuals and hardcopy software discs (e.g., optical discs on which software code has been written) are not included when the computing device is shipped to the customer location, thereby saving the time and effort for a human (or a robot) to find and include in the shipment the hardcopy manuals that conform to a particular specification associated with the customer location or the customer. Not having hardcopies also reduces the shipping weight, thereby saving the manufacturer on shipping costs. When the customer initially powers-on and boots the computing device, the computing device sends the device identifier to the server, the server determines the content (documentation and software) entitlements based on the content identifiers associated with the device identifier and automatically provides digital copies of the content (e.g., documentation and software) to which the customer is entitled. In this way, the customer receives the most recent version of the software and the documentation. If the customer desires a hardcopy of one or more content items (e.g., entitlements), then the customer may use delivery options to specify which of the content items are to be provided as hardcopy (e.g., in addition to being provided digitally over a network). For the content items that the customer has specified a hardcopy, the server may send the content items to a third-party provider that creates a hardcopy of the content items, e.g., by printing and binding digital documentation or by writing software and data to an optical disc. The third-party provider may have a courier deliver the hardcopies to the customer's location. After the customer has received the computing device, the customer can order hardcopies of content. Thus, the customer is provided with softcopies of all content entitlements and provided with hardcopies of content that the customer desires to be provided as hardcopy. In this way, hardcopies of documents and/or software are not provided when the customer does not desire hardcopies, thereby saving on the costs (e.g., paper and printing) of creating hardcopies.

Figure 3:
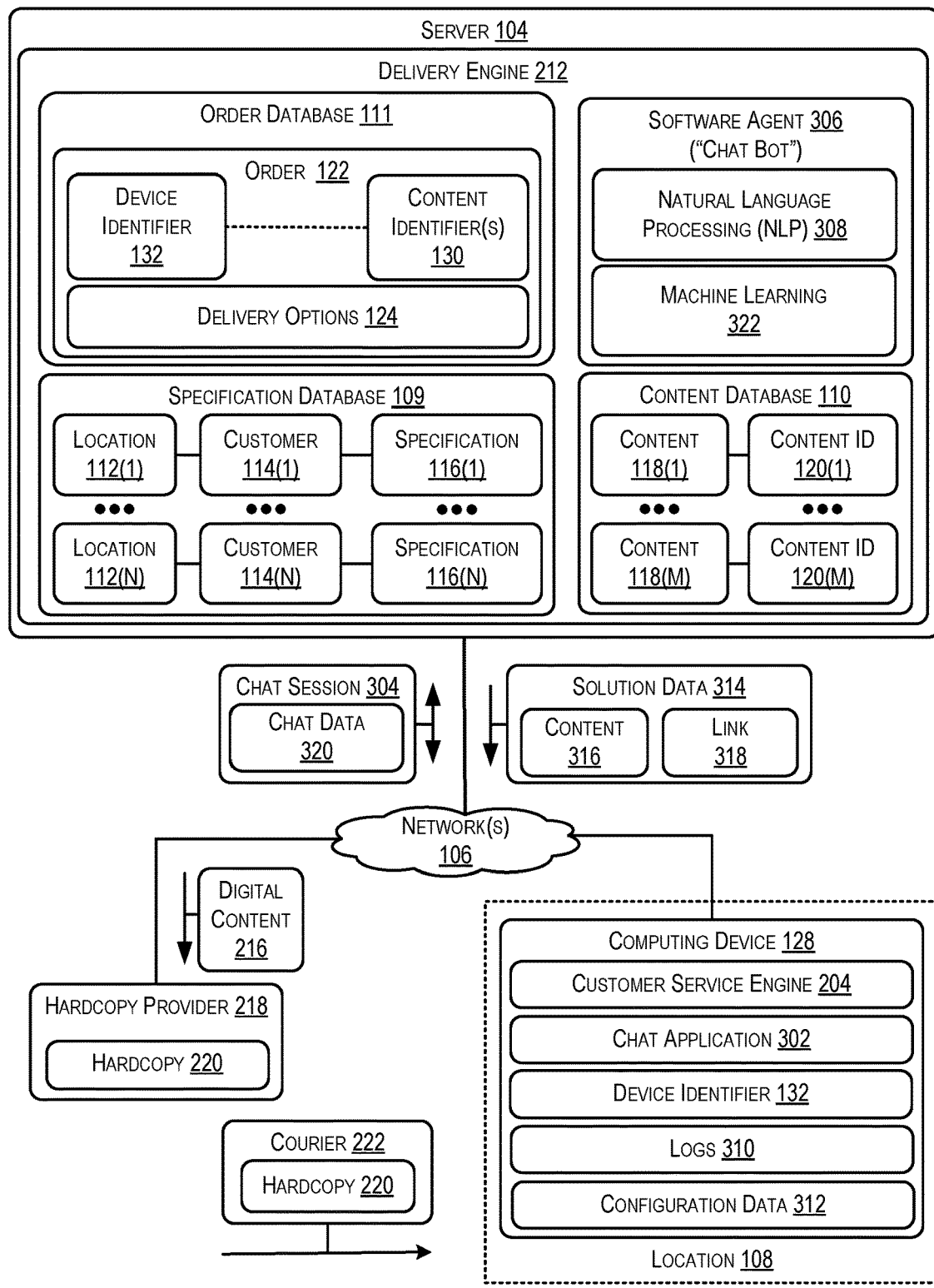
FIG. 3 is a block diagram of a system that includes a computing device to initiate a chat session with a software agent on a server, according to some embodiments.

FIG. 3 is a block diagram of a system that includes a computing device to initiate a chat session with a software agent on a server, according to some embodiments. When the user of the computing device 128 encounters an issue associated with the computing device 128, the user may use a chat application 302 on the computing device 128 to initiate a chat session 304 with a software agent ("chat bot") 306 executing on the server 104. For example, the user may encounter an issue, such as, for example, abnormal functioning of an operating system or a software application, a frozen screen, a sudden shut down, dropped or slow internet connection, malfunctioning of peripherals connected to the computing device, virus attack, or the like.

During the chat session, the server 104 may receive chat data 320, via the chat session 304, from the computing device 128. The chat data 320 may include text input by the user in response to questions asked by the software agent 306. The software agent 306 may use natural language processing (NLP) 308 to process the text input provided by the user. When the chat session 304 is initiated (or in response to a command from the software agent 306), the chat application 302 may automatically send (e.g., in the chat data 320) data, such as, for example, the device identifier 132, one or more logs 310 (e.g., system logs, operating system logs, application logs, and the like), configuration data 312 associated with a configuration of the computing device 128, other information related to the computing device 128, or any combination thereof.

The software agent 306 may identify a platform of the computing device 128 (e.g., Latitude, Inspiron, Alienware, Vostro etc.) and an original (e.g., as configured at the factory) configuration of the computing device 128 and compare the original configuration with the current configuration (e.g., as described by the configuration data 312). The software agent 214 may use machine learning 322 to predict a most likely solution for the issue(s) based on the chat data 320 received in the chat session 304. The software agent 214 may provide solution data 314 to address the user's issue. The solution data 314 may include content 316, a link 318, or both. The content 316 may include one or more of the content 118 from the content database 110 and may include updated documentation, updated software, a bug fix, a configuration file, or other content. The customer service engine 204 may receive the content 316 and perform an appropriate action. For example, the customer service engine 204 may automatically install updated software, a bug fix, a configuration file, or another type of software to address the issue. The customer service engine 204 may automatically install updated documentation and open the documentation to a location that has information about a solution to the user's issue. For example, if the user is having networking issues, the documentation may be associated with a network interface card (NIC) and the customer service engine 204 may open the documentation to a section on troubleshooting the NIC, configuring the NIC, or ways to address a common issue with the NIC. The solution data 314 may include the link 318, e.g., a link to a website hosted by the server 104, a link to a document (e.g., html, pdf, and the like), a link to a video (mp4, flash etc.), or other content relevant to resolving the user's issues.

The software agent 214 may send the solution data 314 to the customer service engine 204 on the computing device 128 that causes the customer service engine 204 to automatically download and install updated software (e.g., updated application, updated driver, updated operating system, software patch etc.). For example, the software agent 214 may determine that updated software addresses the user's issue. The software agent 214 may retrieve the updated software from the content database 110 and send the content 316 (e.g., the updated software) to the computing device 128.

The server 104 may determine a delivery mode of digital content using the delivery options 124. For example, the user may have purchased a photo editor application and is having an issue with the photo editor application. The user may have purchased hardcopy documentation for the photo editor application. The software agent 306 may determine that updated software and updated documentation are available for the photo editor application. The software agent 306 may send the updated photo editor application to the computing device 128 and the customer service engine 204 may automatically install the updated photo editor application. The software agent 306 may send the digital content 216 (e.g., the updated documentation for the photo editor application) to the hardcopy provider 218 and the hardcopy provider 218 may create the hardcopy 220 corresponding to the digital content 216 and have the hardcopy delivered to the customer location 108 via the courier 222.

Thus, when a user has an issue with a computing device, the user may initiate a chat session with a software agent executing on a server. The software agent may gather information about the issue using the chat session, including asking the user questions about the issue and requesting logs, configuration data, and other information from the computing device. If the issue can be addressed by providing updated software and/or updated documentation, the software agent may provide the updated software and the updated documentation and have them automatically installed on the computing device. Thus, by having all content digitally delivered, the digital content database can be leveraged to address a user's issue.

Figure 4:
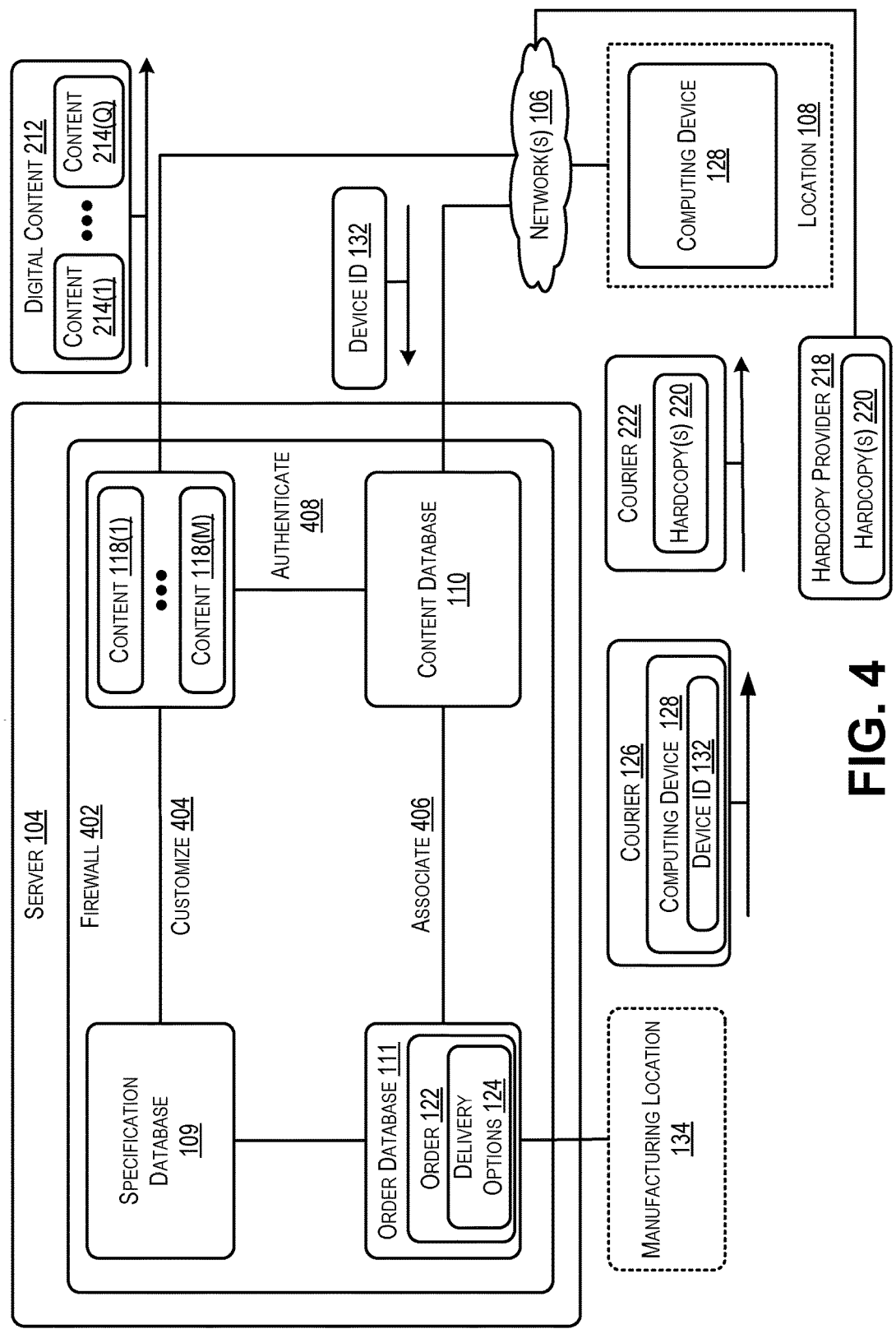
FIG. 4 is a block diagram of a system that includes delivering hardcopy content to a customer location, according to some embodiments.

FIG. 4 is a block diagram of a system 400 that includes delivering hardcopy content to a customer location, according to some embodiments. After a customer place the order 122 to acquire the computing device 128, the computing device 128 may be manufactured and then shipped via the courier 126 from the manufacturing location 134 to the customer location 108. The order 122 may be stored in the order database 111. The computing device 128 may have a unique identifier (e.g., serial number, service tag, or the like), the device identifier 132, that uniquely identifies the computing device 128.

After the order 122 is received, the server 104 may identify a specification in the specification database 109 that is relevant to the customer (e.g., based on the customer's location or based on whether the customer is an enterprise or government entity) and customize 404 the content to be provided to the computing device 128 according to the relevant specification. For example, if the customer is located in Germany, the customer may be provided with documentation that conforms to a specification promulgated by the German government. If the content that complies with the relevant specification is not present in the content database 110, then the server 104 may customize 404 the content "on the fly". For example, the server 104 may use a translation application to automatically translate documentation (e.g., an owner's manual) from a language (e.g., English) to the target language (e.g., German). Thus, if documentation that complies with the relevant specification is unavailable, the server 104 may automatically create custom documentation by modifying (e.g., translating) existing content in the content database 110 to comply with the relevant specification. The customize 404 of the portions of the content 118 that is to be provided to the computing device 128 may be performed while the computing device 128 is in transit from the manufacturing location 134 to the customer location 108.

The server 104 may associate 406 the customer's content entitlement, e.g., content that complies with the relevant specification and to which the customer is entitled based on the order 122, with the device identifier 128. For example, the device identifier 132 may be associated with content 214(1) to 214(Q) (where 0<Q<M) that the customer is entitled to received based on the order 122 and based on the relevant specification from the specification database 109.

After the customer receives the computing device 128, the customer may power-on the computing device 128 causing the computing device 128 to boot. During the boot process, the computing device 128 may send the device identifier 132 associated with the computing device 128 to the server 104.

The server 104 may include a firewall 402 to protect unauthorized access to the content 118. The content database 110 may authenticate 408 the device identifier 132, including determining content entitlements associated with the device identifier 132. Based on the content entitlements, the server 104 may send the digital content 214(1) to 214(Q), including documentation and software, to the computing device 128.

In the order 122, the customer may have specified delivery options 124, identifying content for which the customer desires a hardcopy (e.g., printed documentation, optical disc on which software is written). After the server authenticates 408 the device identifier 132, the server 104 may determine the delivery options 124 associated with the content 214 to which the customer is entitled. Based on the delivery options 124, the server 104 may send at least a portion of the content 214 to the hardcopy provider 218. The hardcopy provider 218 may create hardcopies by printing and binding documentation and by writing software to an optical disc (e.g., CD-ROM, DVD-ROM, or the like) and shipping the hardcopy versions of the content 214 to the customer location 108 using the courier 222.

Thus, a customer may place an order to acquire a computing device and one or more software items (e.g., operating system and applications). The order may be sent to a server. The server may identify content identifiers corresponding to content (documentation, software) to which the customer is entitled, based on the order and the location specification. The content identifiers may be associated with a device identifier (e.g., serial number or service tag) that uniquely identifies the computing device and stored by the server in an order database. In this way, hardcopy manuals and hardcopy software discs (e.g., optical discs on which software code has been written) are not included when the computing device is shipped to the customer location, thereby saving the time and effort for a human (or a robot) to find and include in the shipment the hardcopy manuals that conform to a particular specification associated with the customer location or the customer. Not having hardcopies also reduces the shipping weight, thereby saving the manufacturer on shipping costs.

After the customer powers-on the computing device for the first time, the computing device sends the device identifier to the server, the server determines the content identifiers associated with the device identifier and the content (documentation and software) entitlements based on the content identifiers and automatically provides digital copies of the content (e.g., documentation and software) to the computing device. In this way, the customer receives the most recent version of the software and the documentation.

If the customer desires a hardcopy of one or more content items (e.g., entitlements), then the customer may use delivery options to specify which of the content items are to be provided as hardcopy (e.g., in addition to being provided digitally over a network). For the content items that the customer has specified a hardcopy, the server may send the content items to a third-party provider that creates a hardcopy of the content items, e.g., by printing and binding digital documentation or by writing software and data to an optical disc. The third-party provider may have a courier deliver the hardcopies to the customer's location. After the customer has received the computing device, the customer can order hardcopies of content. Thus, the customer is provided with softcopies of all content entitlements and provided with hardcopies of content that the customer desires to be provided as hardcopy. In this way, hardcopies of documents and/or software are not provided when the customer does not desire hardcopies, thereby saving on the costs (e.g., paper and printing) of creating hardcopies.

Figure 5:
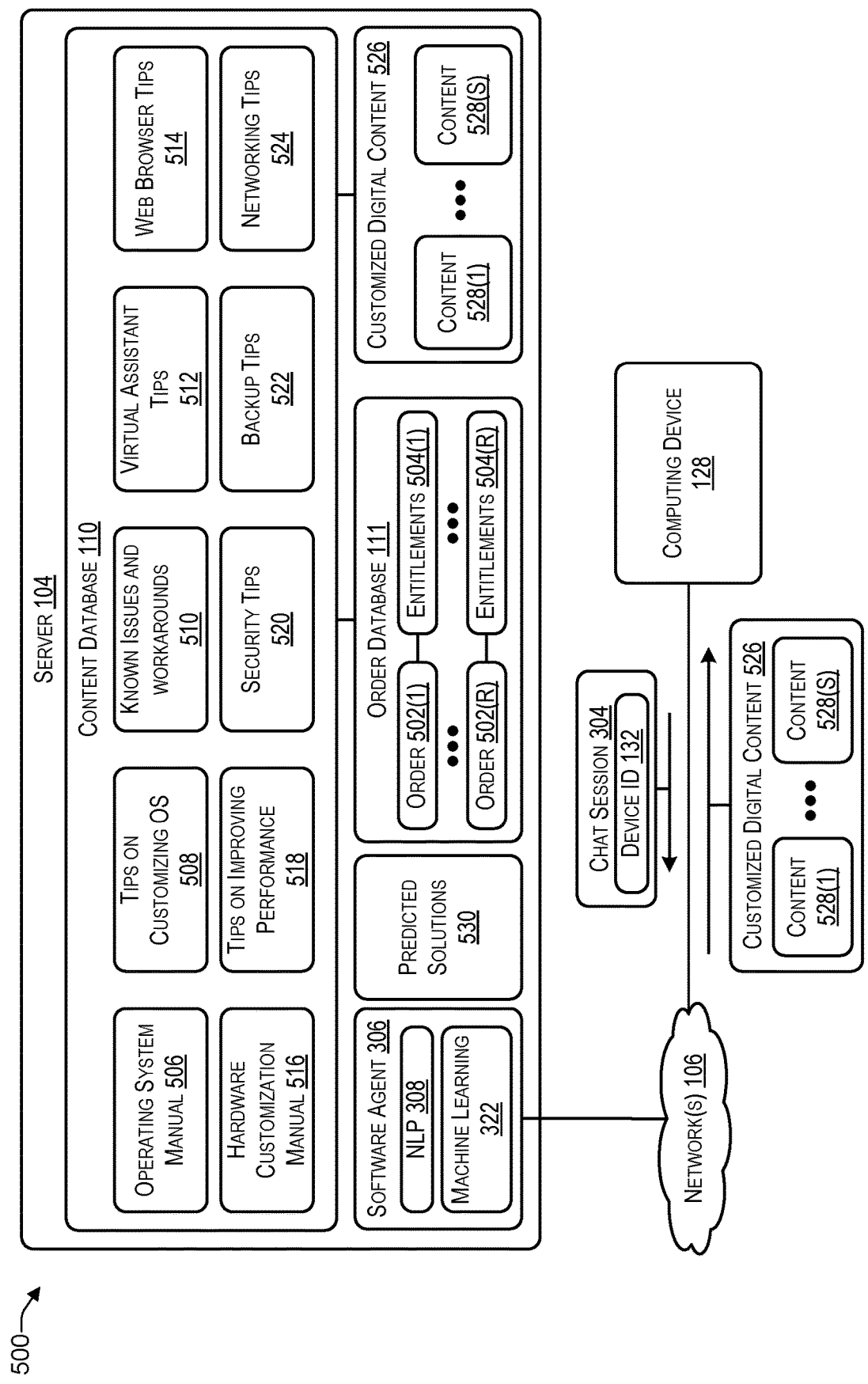
FIG. 5 is a block diagram illustrating delivering customized digital content, according to some embodiments.

FIG. 5 is a block diagram illustrating delivering customized digital content, according to some embodiments. The server 104 may store each order 502(1) to 502(R) (R>0, such as the order 122 of FIGS. 1, 2, 3, and 4) in the order database 111. Based on each order 502, the server 104 may determine the customer's content entitlement, e.g., content to which the customer is entitled based on each order and content that complies with the relevant specification (e.g., location specification, customer specification, or the like). For example, the order 502(1) may be associated with the entitlements 504(1) and the order 502(R) may be associated with the entitlements 504(R).

When the user of the computing device 128 has an issue using the computing device 128, the user may initiate the chat session 304 with the software agent 306. During the chat session, the software agent 306 may retrieve the device identifier 132 (e.g., serial number, service tag, or the like) associated with the computing device 128 and determine the corresponding entitlements 504 using the order database 111. The software agent 306 may ask questions ("What is the issue?", "Are any error messages being displayed?" "What happens if you do X? and the like) and receive responses from the user. The responses from the user may be processed using NLP 308 to identify the likely issue. Machine learning 322 may be used to predict the top X (0<X<=10) solutions 530 for the issue. For example, the predicted solutions 530 may include the top 3, top 5, or top 10 most likely solutions.

Based on the predicted solutions 530, the software agent 306 may create customized digital content 526, including content 528(1) to 528(S), using content in the content database 110. For example, the content database 110 may include an operating system (OS) manual 506, tips on customizing the OS 508, known issues and workarounds 510 (e.g., pulled from a knowledgebase or other repository of information), virtual assistant (e.g., Microsoft Cortana) tips 512, web browser tips 514 (e.g., Microsoft Edge, Google Chrome, or the like), hardware customization manual 516 (e.g., how to add more memory, how to replace a mechanical drive with a solid state drive (SSD), and the like), tips on improving performance 518 (e.g., modifying the OS to improve performance), security tips 520 (e.g. how to configure access levels), backup tips 522 (e.g., how to setup to automatically backup files on the computing device 128), networking tips 524 (e.g., how to improve network throughput and the like), and other content related to the computing device 128.

The customized digital content 526 may include relevant portions of manuals (e.g., the portions of a manual related to the issue may be included in the customized digital content 526 while other portions may not be included), links to videos hosted by the server 104, updated software (e.g., the issue is caused by outdated software and based on the entitlements, the software agent 306 determines that updated software is available), bug fixes to installed software (e.g., the issue is a known bug for which the software manufacturer has issued a bug fix), and other information related to the issue. The software agent may send the customized digital content 526 to the computing device 128 to enable the user to view the customized digital content 526 and perform actions to address the issue.

In the flow diagrams of FIG. 6, 7, 8, 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600, 700, 800, and 900 are described with reference to FIGS. 1, 2, 3, 4, and 5, as described above, although other models, frameworks, systems and environments may be used to implement these processes.

Figure 6:
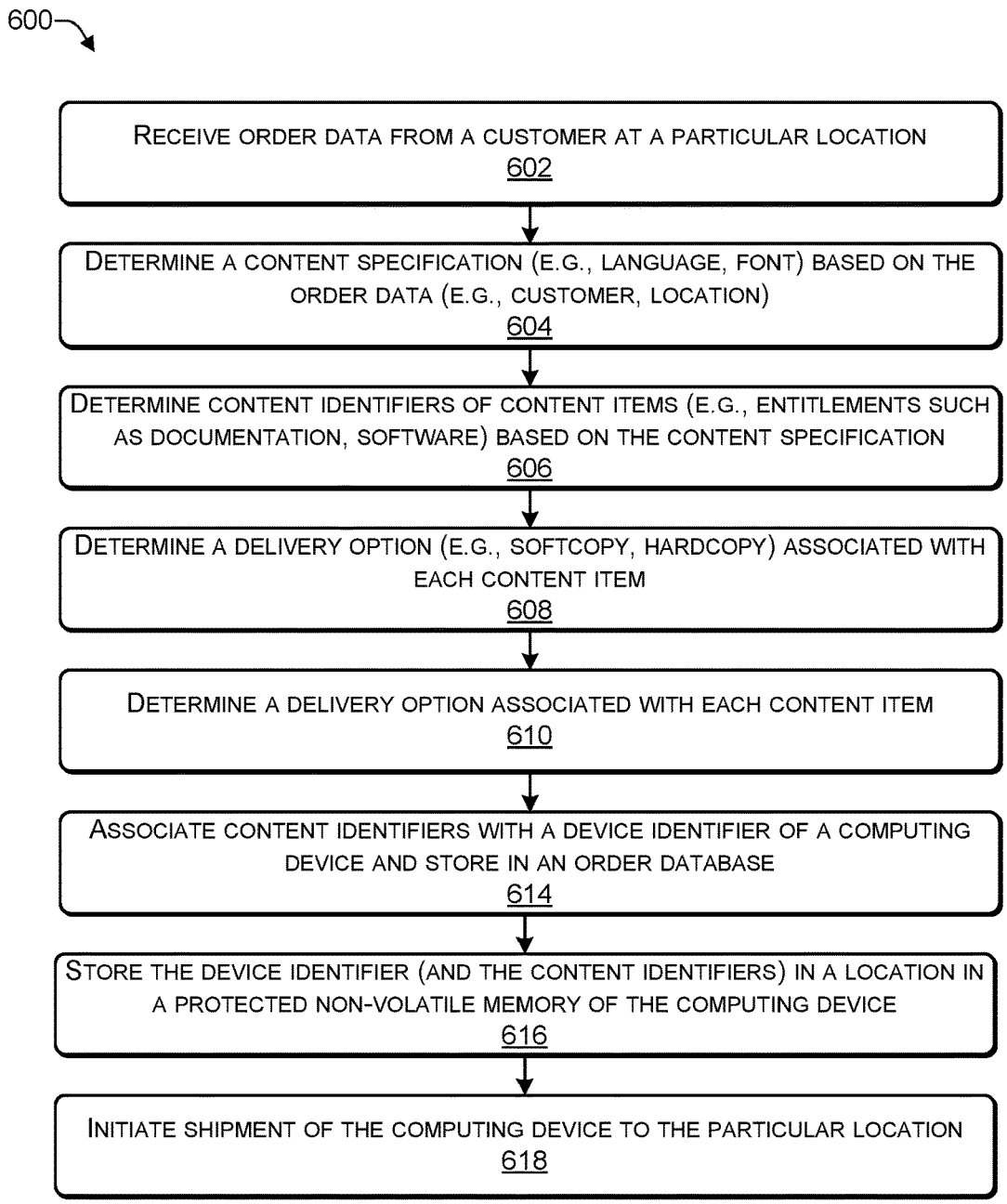
FIG. 6 is a flowchart of a process that includes receiving an order from a customer to acquire a computing device, according to some embodiments.

FIG. 6 is a flowchart of a process 600 that includes receiving an order from a customer to acquire a computing device, according to some embodiments. The process 600 may be performed by the server 104 of FIGS. 1, 2, 3, 4, and 5.

At 602, order data may be received from a customer located at a particular location. At 604, a content specification (e.g., language, font, etc.) based on the order data (e.g., customer, customer location) be determined. At 606, content identifiers of content items (e.g., entitlements such as documentation, software, and the like) may be determined based on the content specification. For example, in FIG. 1, the server 104 may receive the order 122 from the device 102, determine the location 108 to which the computing device 128 is to be shipped, and based on the location 108, determine a corresponding one of the specifications 116(1) to 116(N), where N>0. For example, the location 112(N) may be a country or a state that provides a corresponding specification 116(N). The specification 116(N) may specify that documentation be provided in a particular set of (e.g., one or more) languages. If the server 104 determines that the customer that placed the order 122 is an enterprise customer, a government agency, or the like, the server 104 may determine the customer among customers 114(1) to 114(N) in the specification database 109 and determine a corresponding specification of the specifications 116. In such cases, the specification 116 associated with the customer 114 that placed the order 122 may take precedence over the specification 116 associated with the location 112. Based on the order 122, the server 104 may identify one or more content items (e.g., entitlements, such as documentation, software and the like) from the content 118(1) to 118(M) that are to be provided with the computing device 128 that conform to the specification 116(N).

At 608, a delivery option associated with each content item may be determined. At 610, a delivery option associated with each content item may be determined. At 612, a content identifier associated with each content item may be determined. At 614, the content identifiers may be associated with a device identifier of a computing device and stored in an order database. At 616, the content identifiers may be stored in a non-volatile memory of the computing device. At 618, the computing device may be shipped to the particular location (e.g., via a courier). For example, in FIG. 1, based on the order 122, the server 104 may determine delivery options 124 that identify which of the content items are to be provided as hardcopy (in additional to being provided as softcopy). Based on the order 122, the delivery options 124, and the corresponding specification, the server 104 may determine the corresponding content identifiers from the content identifiers 120(1) to 120(M). The computing device 128 may have an associated device identifier 132, that uniquely identifies the computing device 128, such as a serial number, a service tag, or the like. The server 104 may associate the device identifier 132 with content identifiers 130 and store the device identifier 132 and the content identifiers 130 in an order database. The content identifiers 130 may include one or more of the content identifiers 120 that identify digital content (of the content 118) that is to be provided to the customer based on the order 122. For example, the content identifiers 130 may identify documentation (e.g., owner's manual, troubleshooting guide, and the like) and software (e.g., operating system, anti-virus, productivity application, and the like) that the customer is entitled to receive based on the order 122. The device identifier 132, and, in some cases, the content identifiers 130, may be stored in a protected non-volatile memory of the computing device 128, prior to shipping the computing device 128 to the customer location 108 via the courier 126. The factory may ship the computing device 128 from the manufacturing location 134 to the customer location 108 via the courier 126.

Thus, when a customer places an order to acquire a computing device and one or more software items (e.g., operating system and applications), the order may be sent to a server. The server may determine, based on the order, a location where the order is to be sent and determine a specification associated with the location and, in some cases, a specification associated with the customer. The server may identify content identifiers corresponding to content to which the customer is entitled, based on the order and the location specification (or customer specification). The content identifiers may be associated with a device identifier (e.g., serial number or service tag) that uniquely identifies the computing device and stored by the server in an order database. In this way, hardcopy manuals and hardcopy software discs (e.g., optical discs on which software code has been written) are not included when the computing device is shipped to the customer location, thereby saving the time and effort for a human (or a robot) to find and include in the shipment the hardcopy manuals that conform to a particular specification associated with the customer location or the customer. In this way, the computing device is shipped faster and at a lower shipping cost because hardcopy documentation and software discs are not included when shipping the computing device to the customer location.

Figure 7:
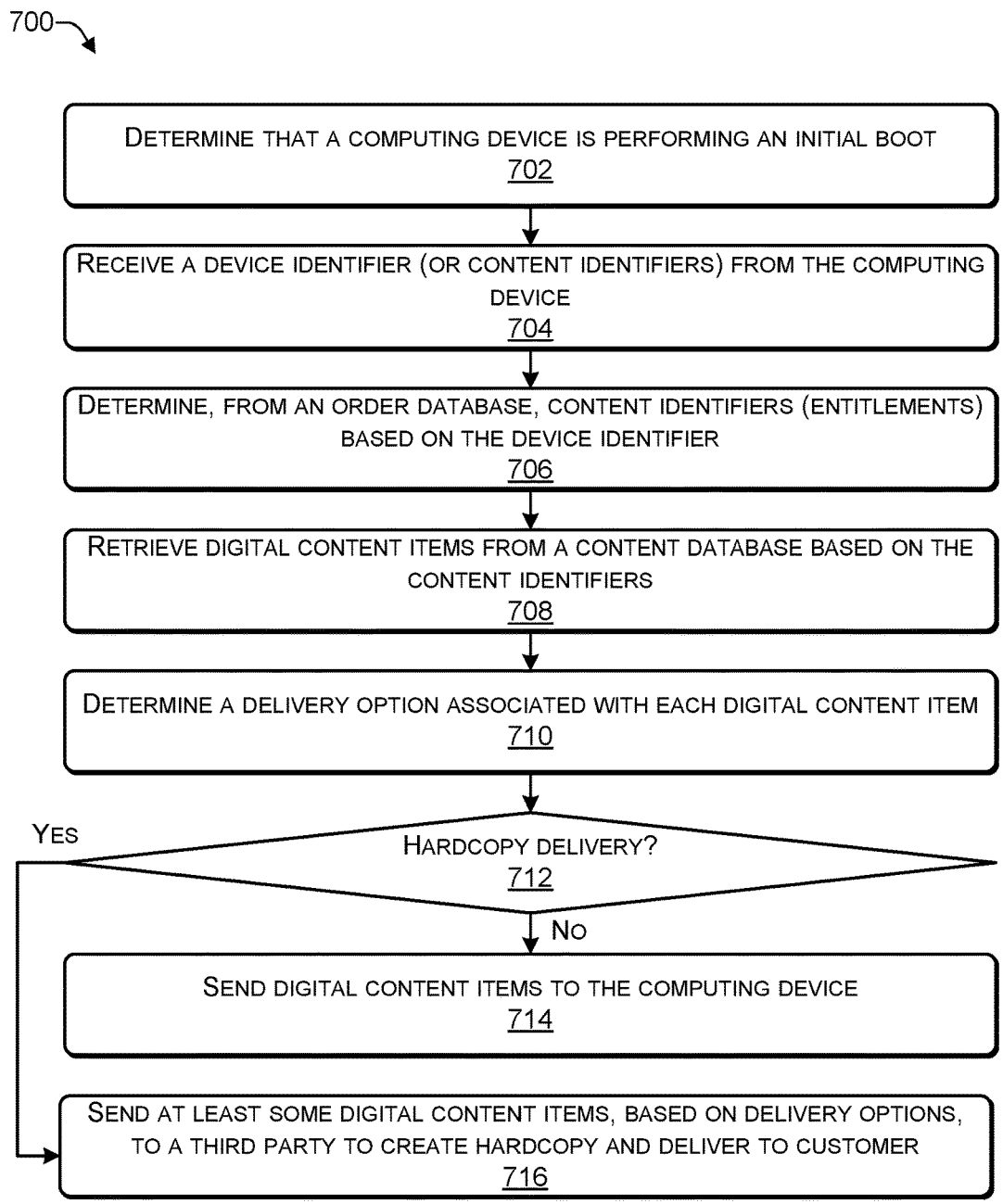
FIG. 7 is a flowchart of a process that includes determining whether to deliver content digitally, as a hardcopy, or both, according to some embodiments.

FIG. 7 is a flowchart of a process 700 that includes determining whether to deliver content digitally, as a hardcopy, or both, according to some embodiments. The process 700 may be performed by the server 104 of FIGS. 1, 2, 3, 4, and 5.

At 702, the process may determine that a computing device is performing an initial boot. At 704, the process may receive a device identifier (or content identifiers) from the computing device. At 706, the process may determine, using an order database, content identifiers based on the device identifiers. At 708, the process may retrieve, from a content database, digital content items corresponding to the content identifiers. For example, in FIG. 2, after receiving the computing device 128, the customer may power-on the computing device 128, causing the computing device 128 to boot. During the boot, the customer service engine 204 may send data to the server 104 indicating that the computing device 128 is performing an initial boot. The customer service engine 204 may automatically retrieve the device identifier 132 and/or the content identifiers 130 from a particular location (e.g., in protected non-volatile memory) of the computing device 128. The customer service engine 204 may send one or more identifiers 210 to a delivery engine 208 executing on the server 104. The identifiers 210 may include the device identifier 132, the content identifiers 130, or both. If the device identifier 132 (without the content identifiers 130) is sent, then the server 104 may use the device identifier 132 to determine, using the order database 111, the content identifiers 130 associated with the device identifier 132. The delivery engine 208 may retrieve, from the content database 110, digital content 214(1) to 214(Q) corresponding to the content identifiers 206(1) to 206(Q), respectively.

At 710, the process may determine a delivery option (e.g., (i) softcopy or (ii) softcopy and hardcopy) associated with each digital content item. At 712, the process may determine whether the delivery option indicates hardcopy delivery. If the process determines, at 712, that the delivery option does not indicate hardcopy delivery then the process may proceed to 714 and the digital content items may be sent to the computing device via a network. If a determination is made at, at 712, that the delivery option indicates hardcopy delivery, then the process may proceed to 716 where the digital content items based on the delivery options may be sent to a third party to create hardcopy and the delivery to the customer. For example, in FIG. 2, the delivery engine 208 may send digital content 212, including the content 214(1) to 214(Q), to the customer service engine 204. The customer service engine 204 may install the digital content 212 on the computing device 128. For example, when the content 214 comprises documentation, the customer service engine 204 may place the documentation in a particular location and enable the customer to access the documentation, e.g., via a help application. When the content 214 comprises software (e.g., anti-virus, office suite, photo editor, video editor, illustrator, painter, or the like), the customer service engine 204 may automatically (e.g., without human interaction) install the software on the computing device 128. The customer order 122 may specify delivery options 124 indicating that the customer desires a hardcopy of particular documentation or particular software. If the delivery options 124 indicate that the user has ordered (e.g., purchased) hardcopy of one or more of the content items 214, then the delivery engine 208 may send digital content 216 (e.g., one or more of the content items 214(1) to 214(Q)) to a hardcopy provider 218. For example, after the delivery engine 208 receives the identifiers 210 and looks up the order 122, the delivery engine 208 may determine the delivery options 124 and send the digital content 216 to the hardcopy provider 218 based on the delivery options 124. The hardcopy provider 218 may create one or more hardcopies 220 corresponding to the digital content 216. For example, when the digital content 216 includes documentation, then the hardcopy provider 218 may print and bind the digital content 216 (e.g., in a format such as pdf, word, html or the like) to create the hardcopy 220. When the digital content 216 includes software, then the hardcopy provider 218 may write the digital content 216 (e.g., in a format such as .exe, .msi, or another type of executable file) to an optical disc (e.g., CD-ROM, DVD-ROM, or the like) to create the hardcopy 220. The hardcopy provider 218 may use a courier 222 (e.g., postal service, FedEx, UPS, DHL, or the like) to deliver the hardcopy 220 to the customer location 108.

Thus, when the customer initially powers-on and boots the computing device, the computing device sends the device identifier to the server, the server determines the content (documentation and software) entitlements based on the content identifiers associated with the device identifier and automatically provides digital copies of the content (e.g., documentation and software) to which the customer is entitled. In this way, the customer receives the most recent version of the software and the documentation. If the customer desires a hardcopy of one or more content items (e.g., entitlements), then the customer may use delivery options to specify which of the content items are to be provided as hardcopy (e.g., in addition to being provided digitally over a network). For the content items that the customer has specified a hardcopy, the server may send the content items to a third-party provider that creates a hardcopy of the content items, e.g., by printing and binding digital documentation or by writing software and data to an optical disc. The third-party provider may have a courier deliver the hardcopies to the customer's location. In this way, hardcopies of documents and/or software are not provided when the customer does not desire hardcopies, thereby saving on the costs (e.g., paper and printing) of creating hardcopies.

Figure 8:
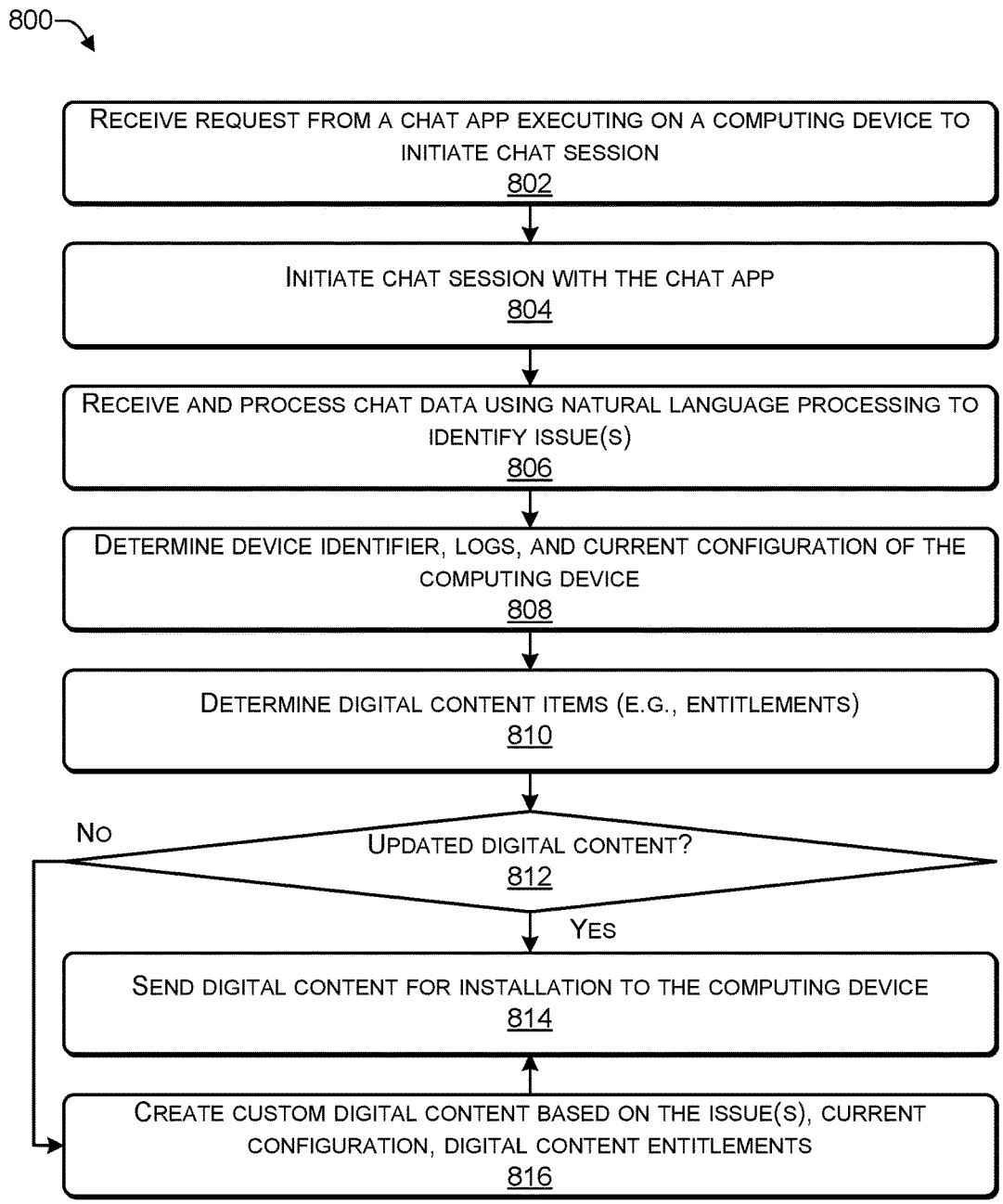
FIG. 8 is a flowchart of a process that includes initiating a chat session between a computing device and a software agent on a server, according to some embodiments.

FIG. 8 is a flowchart of a process 800 that includes initiating a chat session between a computing device and a software agent on a server, according to some embodiments. The process 800 may be performed by the server 104 of FIGS. 1, 2, 3, 4, and 5.

At 802, the process may receive a request from a chat application ("app") executing on a computing device to initiate a chat session. At 804, the process may initiate a chat session using the chat app. For example, in FIG. 3, when the user of the computing device 128 encounters an issue associated with the computing device 128, the user may use a chat application 302 on the computing device 128 to initiate a chat session 304 with a software agent ("chat bot") 306 executing on the server 104.

At 806, the process may receive and process chat data using natural language processing to identify one or more issues associated with the computing device. At 808, the process may deter determine a device identifier, logs, and the current configuration of the computing device. For example, in FIG. 3, during the chat session, the server 104 may receive chat data 320, via the chat session 304, from the computing device 128. The chat data 320 may include text input by the user in response to questions asked by the software agent 306. The software agent 306 may use natural language processing (NLP) 308 to process the text input provided by the user. When the chat session 304 is initiated (or in response to a command from the software agent 306), the chat application 302 may automatically send (e.g., in the chat data 320) data, such as, for example, the device identifier 132, one or more logs 310 (e.g., system logs, operating system logs, application logs, and the like), configuration data 312 associated with a configuration of the computing device 128, other information related to the computing device 128, or any combination thereof. The software agent 214 may use machine learning 322 to predict a most likely solution for the issue(s) based on the chat data 320 received in the chat session 304.

At 810, the process may determine digital content items, such as entitlements, based on the device identifier. For example, in FIG. 3, the software agent 306 may determine the device identifier 132 via the chat session 304, and determine the content identifiers 120 (e.g., entitlements) based on the order 122.

At 812, the process may determine whether updated digital content is available. If a determination is made at 812 that updated digital content is available, the process may proceed to 814 where the updated digital content may be sent to the computing device for installation. If a determination is if the process determines at 812 that updated digital content is not available, then the process may proceed to 816, where custom digital content may be created based on the issues current configuration, and digital content entitlements and the process may proceed to 814 where the digital content is sent for installation to the computing device. For example, in FIG. 3, the software agent 214 may use machine learning 322 to predict a most likely solution for the issue(s) based on the chat data 320 received in the chat session 304. The software agent 214 may provide solution data 314 to address the user's issue. The solution data 314 may include content 316, a link 318, or both. The content 316 may include one or more of the content 118 from the content database 110 and may include updated documentation, updated software, a bug fix, a configuration file, or other content. The customer service engine 204 may receive the content 316 and perform an appropriate action. For example, the customer service engine 204 may automatically install updated software, a bug fix, a configuration file, or another type of software to address the issue. For example, in FIG. 5, based on the predicted solutions 530, the software agent 306 may create customized digital content 526, including content 528(1) to 528(S), using content in the content database 110. The customized digital content 526 may include relevant portions of manuals (e.g., the portions of a manual related to the issue may be included in the customized digital content 526 while other portions may not be included), links to videos hosted by the server 104, updated software (e.g., the issue is caused by outdated software and based on the entitlements, the software agent 306 determines that updated software is available), bug fixes to installed software (e.g., the issue is a known bug for which the software manufacturer has issued a bug fix), and other information related to the issue. The software agent may send the customized digital content 526 to the computing device 128 to enable the user to view the customized digital content 526 and perform actions to address the issue.

Thus, when a user has an issue with a computing device, the user may initiate a chat session with a software agent executing on a server. The software agent may gather information about the issue using the chat session, including asking the user questions about the issue and requesting logs, configuration data, a device identifier, and other information from the computing device. If the issue can be addressed by providing updated software and/or updated documentation, the software agent may provide the updated software and the updated documentation and instruct a service engine to automatically install them on the computing device. Thus, by having all content digitally delivered, the digital content database can be leveraged to address a user's issue using a software agent that uses machine learning.

Figure 9:
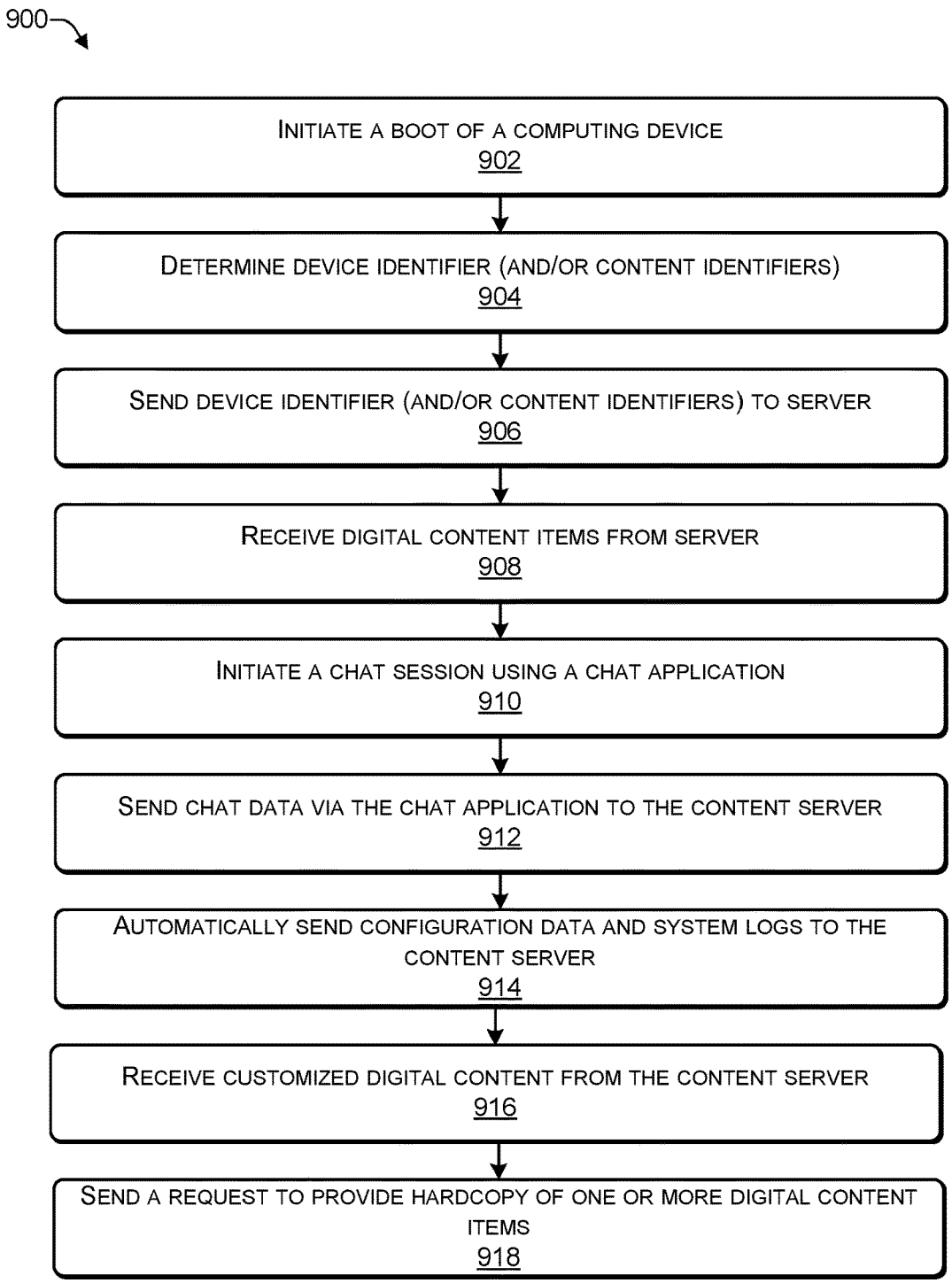
FIG. 9 is a flowchart of a process that includes initiating a first boot of a computing device, according to some embodiments.

FIG. 9 is a flowchart of a process 900 that includes initiating a first boot of a computing device, according to some embodiments. The process 900 may be performed by the computing device 128 of FIGS. 1, 2, 3, 4, and 5.

At 902, the process may initiate a boot of a computing device. At 904, the process may determine a device identifier (and/or content identifiers) associated with the computing device. At 906, the process may send the device identifier (and/or the content identifiers) to a server. At 908, the process may receive digital content items (e.g., entitlements) from the server. For example, in FIG. 2, after receiving the computing device 128, the customer may power-on the computing device 128, causing the computing device 128 to boot. During the boot (e.g., initial boot), the customer service engine 204 automatically retrieve the device identifier 132 (and/or the content identifiers 130) from a particular location (e.g., in protected non-volatile memory) of the computing device 128. The customer service engine 204 may send the identifiers 210 (e.g., the device identifier 132, the content identifiers 130, or both) to the delivery engine 208. If the device identifier 132 is sent without the content identifiers 130, then the server 104 may use the device identifier 132 to determine, using the order database 111, the content identifiers 130 (entitlements) associated with the device identifier 132. The delivery engine 208 may retrieve, from the content database 110, digital content 214(1) to 214(Q) corresponding to the content identifiers 206(1) to 206(Q), respectively. The delivery engine 208 may send the content 214(1) to 214(Q), to the customer service engine 204. The customer service engine 204 may install the digital content 212 on the computing device 128.

At 910, the process may initiate a chat session using a chat application with a software agent executing on a server. For example, in FIG. 3, after the user of the computing device 128 encounters an issue associated with the computing device 128, the user may use the chat application 302 to initiate a chat session 304 with the software agent ("chat bot") 306 executing on the server 104.

At 912, the process may send chat data via the chat application to the content server. At 914, the process may automatically send configuration data and system logs to the content server. For example, in FIG. 3, during the chat session, the server 104 may receive chat data 320, via the chat session 304, from the computing device 128. The chat data 320 may include text input by the user in response to questions asked by the software agent 306. The software agent 306 may use natural language processing (NLP) 308 to process the text input provided by the user. When the chat session 304 is initiated (or in response to a command from the software agent 306), the chat application 302 may automatically send data (e.g., the chat data 320), such as, for example, the device identifier 132, one or more logs 310 (e.g., system logs, operating system logs, application logs, and the like), configuration data 312 associated with a configuration of the computing device 128, other information related to the computing device 128, or any combination thereof.

At 916, customized digital content the process may receive customized digital content from the content server. For example, in FIG. 5, the responses from the user may be processed using NLP 308 to identify the likely issue. Machine learning 322 may be used to predict the top X (0<X<=10) solutions 530 for the issue. For example, the predicted solutions 530 may include the top 3, top 5, or top 10 most likely solutions. Based on the predicted solutions 530, the software agent 306 may create customized digital content 526, including content 528(1) to 528(S), using content in the content database. The customized digital content 526 may include relevant portions of manuals (e.g., the portions of a manual related to the issue may be included in the customized digital content 526 while other portions may not be included), links to videos hosted by the server 104, updated software (e.g., the issue is caused by outdated software and based on the entitlements, the software agent 306 determines that updated software is available), bug fixes to installed software (e.g., the issue is a known bug for which the software manufacturer has issued a bug fix), and other information related to the issue. The software agent may send the customized digital content 526 to the computing device 128 to enable the user to view the customized digital content 526 and perform actions to address the issue.

At 918, the process may send a request to provide hardcopy of one or more digital content items. For example, in FIG. 3, if the user requests a hardcopy of one or more digital content items during the chat session 304, the software agent 306 may send at least a portion of the solution data 314, e.g., the digital content 216, to the hardcopy provider 218. The hardcopy provider 218 may create the hardcopy 220 and have the hardcopy 220 delivered via the courier 222 to the customer location 108.

Figure 10:
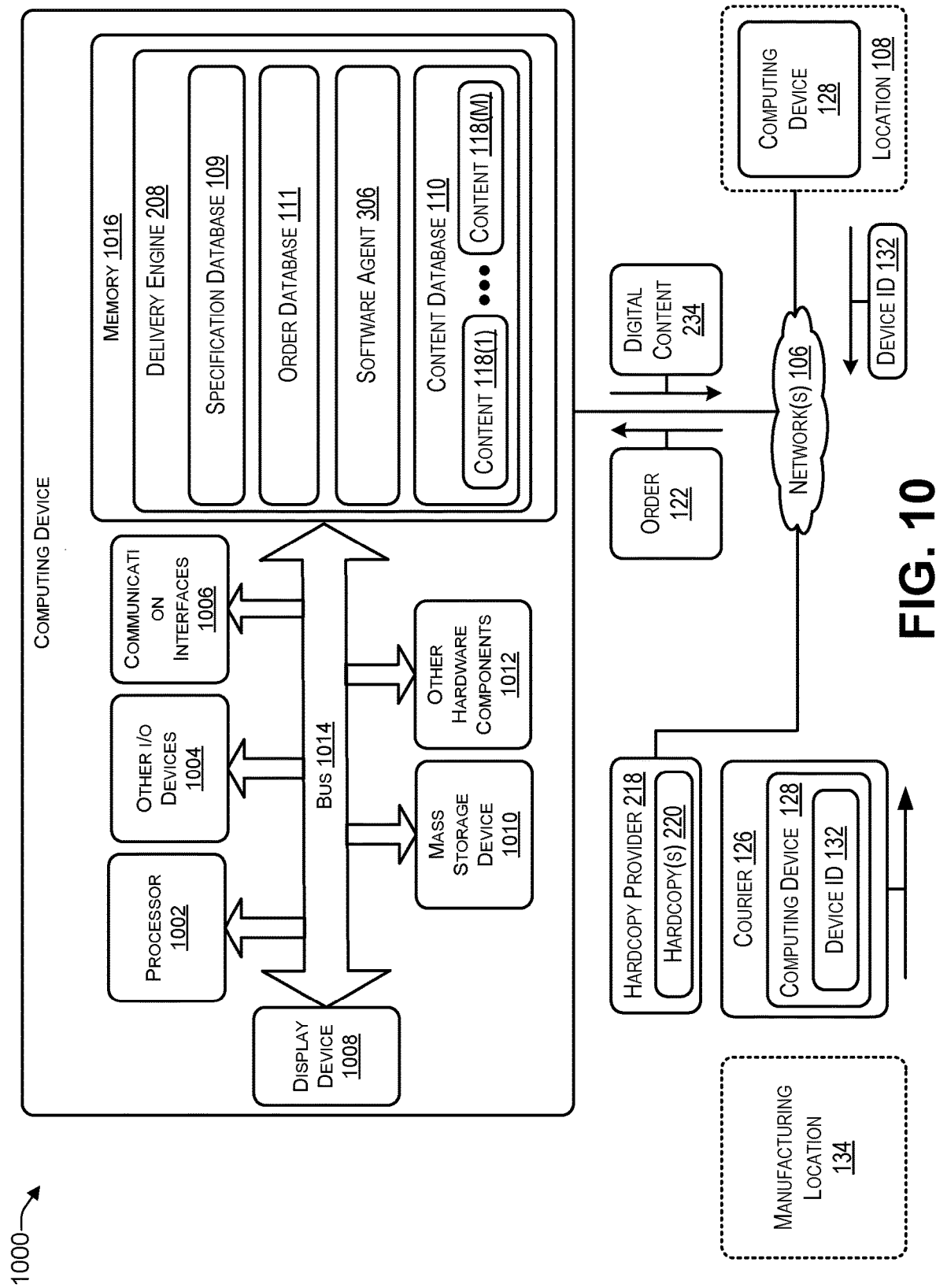
FIG. 10 illustrates an example configuration of a computing device that can be used to implement the systems and techniques described herein.

FIG. 10 illustrates an example configuration of a computing device 1000 that can be used to implement the systems and techniques described herein, such as for example, the computing device 128 or the server 104 of FIGS. 1, 2, 3, 4, and 5. In FIG. 10, the computing device 1000 is illustrated as implementing the server 104.

The computing device 1000 may include at least one processor 1002, a random access memory (RAM) 1016, other input/output (I/O) devices 1004 (e.g., keyboard, trackball, and the like), communication interfaces 1006, a display device 1008, other hardware components 1012 (e.g., optical drive such as CD, DVD, or Blu-ray), and one or more mass storage devices 1010 (e.g., disk drive, solid state disk drive, non-volatile memory express (NVME) drive, or the like), configured to communicate with each other, such as via one or more system buses 1014 or other suitable connections. While a single system bus 1014 is illustrated for ease of understanding, it should be understood that the system buses 1014 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The CPU 1002 is a hardware device that may include a single processing unit or a number of processing units, all of which may include single or multiple computing units or multiple cores. The CPU 1002 may include a graphics processing unit (GPU) that is integrated into the CPU 1002 or the GPU may be a separate processor device from the CPU 1002. The CPU 1002 may be implemented as one or more microprocessors, microcomputers, microcontrollers, digital signal processors, central processing units, graphics processing units, state machines, logic circuitries, and/or any hardware devices that manipulate signals based on operational instructions. Among other capabilities, the CPU 1002 may be configured to fetch and execute computer-readable instructions stored in the memory 504, mass storage devices 512, or other computer-readable media.

Memory 1016 and mass storage devices 1010 are examples of non-transitory computer storage media (e.g., memory storage devices) for storing instructions that can be executed by the processors 1002 to perform the various functions described herein. For example, memory 1016 may include both volatile memory and non-volatile memory (e.g., RAM, ROM, or the like) devices. Further, mass storage devices 1010 may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory 1016 and mass storage devices 1010 may be collectively referred to as memory or computer storage media herein and may be any type of non-transitory media capable of storing computer-readable, processor-executable program instructions as computer program code that can be executed by the processors 1002 as a particular machine configured for carrying out the operations and functions described in the implementations herein.

The computing device 1000 may include one or more communication interfaces 1006 for exchanging data via a network. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1006 can also provide communication with external storage, such as a storage array, network attached storage, storage area network, cloud storage, or the like.

The display device 1008 may be used for displaying content (e.g., information and images) to users. Other I/O devices 1004 may be devices that receive various inputs from a user and provide various outputs to the user, and may include a keyboard, a touchpad, a mouse, a printer, audio input/output devices, and so forth. The computer storage media, such as memory 1016 and mass storage devices 1010, may be used to store software and data, such as, for example, the delivery engine 208, the database 109, 110, 111, and the software agent 306.

Thus, when a customer places the order 122 to acquire the computing device 128, the order 122 may be sent to the computing device 1000, such as the server 104. The server 104 may identify content identifiers corresponding to content 118 to which the customer is entitled, based on the order 122, the customer that placed the order 122, and a location specification in the specification database 109. The content identifiers may be associated with the device identifier 132 (e.g., serial number or service tag) that uniquely identifies the computing device 128 and stored by the server 104 in the order database 111. In this way, hardcopy manuals and hardcopy software discs (e.g., optical discs on which software code has been written) are not included when the computing device 128 is shipped to the customer location 108, thereby saving the time and effort for a human (or a robot) to find and include in the shipment the hardcopy manuals that conform to a particular specification associated with the customer location or the customer. Not having hardcopies also reduces the shipping weight, thereby saving the manufacturer on shipping costs.

When the customer powers-on and boots the computing device 128, the computing device 128 sends the device identifier 132 to the server 104, the server 104 determines the content (documentation and software) entitlements based on the content identifiers associated with the device identifier 132 and automatically provides the digital content 234 (e.g., documentation and software) to which the customer is entitled via the network 106. In this way, the customer receives the most recent version of the software and the documentation. If the customer desires a hardcopy of one or more content items (e.g., entitlements), then the customer may use delivery options (in the order 122) to specify which of the content items are to be provided as hardcopy (e.g., in addition to being provided as the digital content 234). For the content items that the customer has specified a hardcopy delivery option, the server 104 may send the content items (e.g., at some of the digital content 234) to hardcopy provider 218 that creates the hardcopy 220 of the content items, e.g., by printing and binding digital documentation or by writing software and data to an optical disc. The hardcopy provider 218 may have the hardcopies delivered to the customer's location. After the customer has received the computing device, the customer can order hardcopies of content. In this way, hardcopies of documents and/or software are not provided when the customer does not desire hardcopies, thereby saving on the costs (e.g., paper and printing) of creating hardcopies.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. One or more non-transitory computer readable media storing instructions executable by one or more processors to perform operations comprising:
   receiving, from a customer, an order comprising a request to acquire a computing device;
   determining, based on the order, a location of the customer;
   determining a documentation specification based on the location and the customer;
   determining, based on the order and the documentation specification, a first content identifier associated with a document to be provided with the order;
   determining, based on the order, a second content identifier associated with a software application to be provided with the order;
   instructing a courier to deliver the computing device to the location without including hardcopies of content to be provided with the order;
   receiving a message from the computing device to initiate a chat session;
   initiating the chat session between a software agent and a chat application executing on the computing device;
   receiving, via the chat session, a unique identifier identifying the computing device;
   determining, based on the unique identifier, a plurality of content identifiers including the first content identifier and the second content identifier;
   receiving, via the chat session, information from the customer describing an issue associated with the computing device;
   parsing the information using Natural Language Processing (NLP) to create parsed information;
   sending, based on the parsed information, a request to the chat application to send configuration data and logs associated with the computing device;
   receiving, from the chat application, the configuration data and the logs associated with the computing device;
   determining, based on the parsed information, the configuration data and the logs, additional digital content comprising additional documentation and additional software; and
   sending, based on the parsed information, the configuration data and the logs, the additional digital content to the computing device.

2. The one or more non-transitory computer readable media of claim 1, the operations further comprising:
   determining, based on the unique identifier and the configuration data, a platform type of the computing device, a current hardware configuration of the computing device, and a current software configuration of the computing device.

3. The one or more non-transitory computer readable media of claim 1, wherein:
   the additional digital content comprises at least one of an updated digital document or an updated software application; and
   the chat application automatically installs the additional digital content on the computing device.

4. The one or more non-transitory computer readable media of claim 1, the operations further comprising:
   customizing the additional digital content based on the parsed information, the configuration data and the logs to create customized digital content; and
   sending the customized digital content to the computing device.

5. The one or more non-transitory computer readable media of claim 1, the operations further comprising:
   receiving, from the chat application, a request to provide the additional digital content as a hardcopy; and
   sending, the additional digital content to a hardcopy provider, wherein the hardcopy provider creates the hardcopy corresponding to the additional digital content and sends the hardcopy to the location of the customer.

6. The one or more non-transitory computer readable media of claim 1, wherein the unique identifier comprises at least one of a service tag or a serial number.

7. A method comprising:
   receiving, by one or more processors of a server and from a customer, an order comprising a request to acquire a computing device;
   determining, by the one or more processors and based on the order, a location of the customer;
   determining, by the one or more processors, a documentation specification based on the location and the customer;
   determining, by the one or more processors and based on the order and the documentation specification, a first content identifier associated with a document to be provided with the order;
   determining, by the one or more processors and based on the order, a second content identifier associated with a software application to be provided with the order;
   instructing, by the one or more processors, a courier to deliver the computing device to the location without including hardcopies of content to be provided with the order;
   receiving, by the one or more processors, a message from the computing device to initiate a chat session;
   initiating, by the one or more processors, the chat session between a software agent and a chat application executing on the computing device;
   receiving, by the one or more processors and via the chat session, a unique identifier identifying the computing device;
   determining, by the one or more processors and based on the unique identifier, a plurality of content identifiers including the first content identifier and the second content identifier;
   receiving, by the one or more processors and via the chat session, information from the customer describing an issue associated with the computing device;
   parsing, by the one or more processors, the information using Natural Language Processing (NLP) to create parsed information;
   sending, by the one or more processors and based on the parsed information, a request to the chat application to send configuration data and logs associated with the computing device;
   receiving, by the one or more processors and from the chat application, the configuration data and the logs associated with the computing device;
   determining, by the one or more processors and based on the parsed information, the configuration data and the logs, additional digital content comprising additional documentation and additional software; and
   sending, by the one or more processors and based on the parsed information, the configuration data and the logs, the additional digital content to the computing device.

8. The method of claim 7, wherein the documentation specification comprises at least one of a font type specification, a font size specification, and a language specification.

9. The method of claim 7,
wherein the unique identifier comprises at least one of a service tag or a serial number.

10. The method of claim 9, further comprising:
associating the unique identifier with the plurality of content identifiers; and
storing the unique identifier and the associated plurality of content identifiers in a database.

11. The method of claim 9, further comprising:
receiving, during an initial boot of the computing device, the unique identifier;
determining, using a database, the plurality of content identifiers associated with the unique identifier; and
sending, to the computing device, a plurality of content corresponding to the plurality of content identifiers, wherein the plurality of content includes the document associated with the first content identifier and the software associated with the second content identifier.

12. The method of claim 7, wherein the customer specifies, in the order, particular content items that are to be provided as a hardcopy.

13. A server comprising:
one or more processors; and
one or more non-transitory computer readable media storing instructions executable by the one or more processors to perform operations comprising:
receiving, from a customer, an order comprising a request to acquire a computing device;
determining, based on the order, a location of the customer;
determining a documentation specification based on the location and the customer;
determining, based on the order and the documentation specification, a first content identifier associated with a document to be provided with the order;
determining, based on the order, a second content identifier associated with a software application to be provided with the order;
instructing a courier to deliver the computing device to the location without including hardcopies of content to be provided with the order;
receiving a message from the computing device to initiate a chat session;
initiating the chat session between a software agent and a chat application executing on the computing device;
receiving, via the chat session, a unique identifier identifying the computing device;
determining, based on the unique identifier, a plurality of content identifiers including the first content identifier and the second content identifier;
receiving, via the chat session, information from the customer describing an issue associated with the computing device;
parsing the information using Natural Language Processing (NLP) to create parsed information;
sending, based on the parsed information, a request to the chat application to send configuration data and logs associated with the computing device;
receiving, from the chat application, the configuration data and the logs associated with the computing device;
determining, based on the parsed information, the configuration data and the logs, additional digital content comprising additional documentation and additional software; and
sending, based on the parsed information, the configuration data and the logs, the additional digital content to the computing device.

14. The server of claim 13, wherein the documentation specification comprises at least one of a font type specification, a font size specification, and a language specification.

15. The server of claim 13, the operations further comprising:
receiving, during an initial boot of the computing device, the first content identifier;
determining that the document is to be provided as a digital document; and
sending the digital document to the computing device.

16. The server of claim 15, the operations further comprising:
determining that the document is to be provided as a hardcopy document; and
sending the digital document to a hardcopy provider, wherein:
the hardcopy provider is located within a predetermined distance of the location of the customer; and
the hardcopy provider creates the hardcopy document corresponding to the digital document for delivery to the location of the customer.

17. The server of claim 13,
wherein the unique identifier comprises at least one of a service tag or a serial number.

18. The server of claim 17, the operations further comprising:
associating the unique identifier with the first content identifier and the second content identifier; and
storing the unique identifier and the associated first content identifier and the second content identifier in a database.

19. The server of claim 13, wherein the document has a format comprising one of a Portable Document Format (PDF) format or a Hypertext Markup Language (HTML) format.

20. The server of claim 13, the operations further comprising:
receiving, during an initial boot of the computing device, the second content identifier; and
sending, to the computing device, the software application with instructions to automatically install the software application.

* * * * *